United States Patent
Tsai

(10) Patent No.: US 12,554,312 B2
(45) Date of Patent: Feb. 17, 2026

(54) ADAPTIVE POWER SAVE MODE FOR A TOUCH CONTROLLER

(71) Applicant: STMicroelectronics International N.V., Geneva (CH)

(72) Inventor: Ta-Jung Tsai, Taoyuan (TW)

(73) Assignee: STMicroelectronics International N.V., Geneva (CH)

( * ) Notice: Subject to any disclaimer, the term of this patent is extended or adjusted under 35 U.S.C. 154(b) by 213 days.

(21) Appl. No.: 18/521,515

(22) Filed: Nov. 28, 2023

(65) Prior Publication Data

US 2025/0172988 A1     May 29, 2025

(51) Int. Cl.
*G06F 1/3234* (2019.01)
*G06F 3/041* (2006.01)

(52) U.S. Cl.
CPC .......... *G06F 1/3262* (2013.01); *G06F 3/0412* (2013.01)

(58) Field of Classification Search
CPC .............................. G06F 1/3262; G06F 3/0412
See application file for complete search history.

(56) References Cited

U.S. PATENT DOCUMENTS

| | | | |
|---|---|---|---|
| 8,300,019 B2 | 10/2012 | Elias et al. | |
| 9,201,556 B2 | 12/2015 | Free et al. | |
| 9,256,321 B2 | 2/2016 | Wang et al. | |
| 9,904,412 B2 | 2/2018 | Stevenson et al. | |
| 10,007,383 B2 | 6/2018 | Chang et al. | |
| 10,261,685 B2 | 4/2019 | Deselaers et al. | |
| 11,287,926 B1 | 3/2022 | Shahsavari et al. | |
| 11,481,070 B1 | 10/2022 | Ganjali et al. | |
| 2009/0289908 A1 | 11/2009 | Chen et al. | |
| 2014/0062949 A1 | 3/2014 | Chang et al. | |
| 2015/0346903 A1 | 12/2015 | O'Connor | |
| 2017/0116545 A1 | 4/2017 | Johnson et al. | |
| 2021/0072876 A1 | 3/2021 | Nomura | |

OTHER PUBLICATIONS

Nam, Hyoungsik et al., "Review of Capacitive Touchscreen Technologies: Overview, Research Trends, and Machine Learning Approaches," Sensors 2021, https://www.mdpi.com/journal/sensors, Jul. 13, 2021, 26 pages.
Wikipedia, "Machine Learning." https://en.wikipedia.org/wiki/Machine_learning, downloaded Nov. 3, 2022, 31 pages.
Wikipedia, "Regression Analysis." https://en.wikipedia.org/wiki/Regression_analysis, downloaded Nov. 3, 2022, 12 pages.

*Primary Examiner* — Nimesh G Patel
(74) *Attorney, Agent, or Firm* — Slater Matsil, LLP

(57) ABSTRACT

According to an embodiment, a method for operating a touchscreen in active mode is provided. A regression analysis, generating a set of coefficients, is performed on inputs from a respective row of a matrix of sensors at a time instant k. An output matrix is generated by applying a filter transform based on a comparison between the set of coefficients and first threshold values. A touch analysis is performed based on the output matrix. A frame drop analysis is performed to determine whether to skip the current frame for the touch analysis based on a comparison of the set of coefficients and second threshold values. A touch delay analysis is performed to determine whether to change a result of a first number of subsequent frames for the touch analysis based on a comparison of the set of coefficients and third threshold values.

20 Claims, 7 Drawing Sheets

ADAPTIVE POWER SAVE MODE FOR A TOUCH CONTROLLER

TECHNICAL FIELD

The present disclosure generally relates to signal processing and, in particular embodiments, to an adaptive power save mode for a touch controller.

BACKGROUND

Touchscreens are commonly used as an interface mechanism for electronic devices, such as tablets, smartphones, and computers. Touchscreens combine a display to provide outputs with a touch panel to capture inputs. A common type of touchscreen is a capacitive touchscreen. A capacitive touchscreen uses the electrical properties of the human body and an array of capacitive sensors to detect where and when a user touches the screen. A device fitted with a capacitive touchscreen typically includes a sensing grid of capacitive inputs positioned underneath a display panel made of a layer of glass or other transparent material. The sensing grid is typically arranged in a matrix with rows and columns.

When a user touches (e.g., using a finger, capacitive pen, or the like) the capacitive touchscreen, the user's finger or hand, for example, acts as a conductor, and a small charge is drawn to the point of contact, which results in a change in capacitance. A controller, coupled to the array of capacitive inputs, detects the change in capacitance by recognizing, for example, a change in the current or voltage at the contact point. The controller determines the location of the touch and executes an appropriate action. For example, if the touch is a swipe or tap, the controller may signal an operating system to open an app or pause a video.

Generally, the touchscreen operates in three distinct modes: OFF, idle, and active. In OFF mode, the touchscreen is completely deactivated. Both the display and the touch functionality are non-operational, implying that the device is not in use and is conserving maximum power. In idle mode, while the screen display may be active, the touchscreen functionality is not operational. This means the user may see the display, but interacting with it via touch won't yield any response. In this state, the device is in a power-saving mode, conserving energy by limiting the functionality of the touchscreen interface. Active mode is where the screen display and touchscreen functionalities are fully operational. In this state, the user can interact with the device using touch inputs, and the device responds accordingly. This is the operational mode that allows full interaction but also consumes the most power due to the active functionalities.

The system can dynamically manage transitions between idle and active modes based on user interactions with the screen. If a touch is detected, or a noisy signal is interpreted as a touch, the system promptly switches from idle to active mode to allow user interaction. Conversely, if there is a lack of touch interactions over, for example, a specified number of frames, the system reverts from active back to idle mode to conserve power. This transitioning between the modes ensures optimal power management while maintaining user-friendly responsiveness when needed. A system, method, device, and circuit that can improve the transitions between idle and active modes, and further improve the power consumption in each mode are desirable.

SUMMARY

Technical advantages are generally achieved by embodiments of this disclosure, which describe an adaptive power save mode for a touch controller.

A first aspect relates to a method for operating a touchscreen in active mode. The method includes performing a regression analysis on each subset of a dataset for a current scan frame of the touchscreen, each subset of the dataset corresponding to inputs from a respective row of a matrix of sensors at a time instant k, the regression analysis generating a set of coefficients; applying a filter transform on each subset of the dataset based on a comparison between the set of coefficients and first threshold values to generate an output matrix; determining whether to perform a touch analysis by a user on the touchscreen based on the output matrix; determining a frame drop corresponding to determining whether to skip the current frame for the touch analysis based on a comparison of the set of coefficients and second threshold values; and determining a touch delay corresponding to determining whether to change a result of a first number of subsequent frames for the touch analysis based on a comparison of the set of coefficients and third threshold values.

A second aspect relates to a device. The device includes a grid sensor comprising a matrix of sensors arranged in a grid; a non-transitory memory storage comprising instructions; and a processor in communication with the non-transitory memory storage and the grid sensor, wherein the instructions, when executed by the processor, cause the processor to: perform a regression analysis on each subset of a dataset for a current scan frame of the touchscreen, each subset of the dataset corresponding to inputs from a respective row of a matrix of sensors at a time instant k, the regression analysis generating a set of coefficients, apply a filter transform on each subset of the dataset based on a comparison between the set of coefficients and first threshold values to generate an output matrix, determine whether to perform a touch analysis by a user on the touchscreen based on the output matrix, determine a frame drop corresponding to determining whether to skip the current frame for the touch analysis based on a comparison of the set of coefficients and second threshold values, and determine a touch delay corresponding to determining whether to change a result of a first number of subsequent frames for the touch analysis based on a comparison of the set of coefficients and third threshold values.

A third aspect relates to a non-transitory computer readable media storing computer instructions for operating a touchscreen in active mode, that when executed by a processor, cause the processor to: perform a regression analysis on each subset of a dataset for a current scan frame of the touchscreen, each subset of the dataset corresponding to inputs from a respective row of a matrix of sensors at a time instant k, the regression analysis generating a set of coefficients; apply a filter transform on each subset of the dataset based on a comparison between the set of coefficients and first threshold values to generate an output matrix; determine whether to perform a touch analysis by a user on the touchscreen based on the output matrix; determine a frame drop corresponding to determining whether to skip the current frame for the touch analysis based on a comparison of the set of coefficients and second threshold values; and determine a touch delay corresponding to determining whether to change a result of a first number of subsequent frames for the touch analysis based on a comparison of the set of coefficients and third threshold values.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a capacitive touchscreen, it should also be appreciated that these inventive aspects may also apply to the processing of other types of sensor inputs. In particular, aspects of this disclosure may similarly apply to any grid-type sensor used in, for example, image recognition or object detection.

Generally, a grid-type sensor is a type of sensor that is arranged in a matrix or grid pattern. The grid pattern allows the sensor to sense a greater range of inputs over a large input area. Further, the specific technology that embodiments of this disclosure apply to is not limited to a capacitive sensor. For example, a grid-type sensor based on optical, acoustic, or electromagnetic principles may also, advantageously implement the embodiments disclosed.

Embodiments of this disclosure provide an adaptive power save mode that reduces power consumption in idle and active modes for a touchscreen interface. In embodiments, machine learning and regression analysis is utilized in touchscreen applications to improve the transition between idle and active modes and conserve power within device 100 in each mode. In embodiments, a false transition from idle to active mode due to noise is greatly reduced. In the rare event that the disclosed transition from idle to active mode results from a false touch detection in idle mode, device 100 reverts from active mode to idle mode after continuously detecting a no touch event by monitoring the raw data for several subsequent frames after the transition from idle to active mode. Further, during active mode, the scan rate is dynamically adjusted.

Adaptive noise immunity in touch detection is a technique employed to enhance the performance and accuracy of touchscreen interfaces. This technique distinguishes between genuine touch inputs and environmental noise or unintended touches, ensuring the touchscreen responds accurately to user interactions. Aspects of this disclosure provide a solution that improves noise immunity in touch detection. These and other details are discussed in greater detail below.

Figure 1:
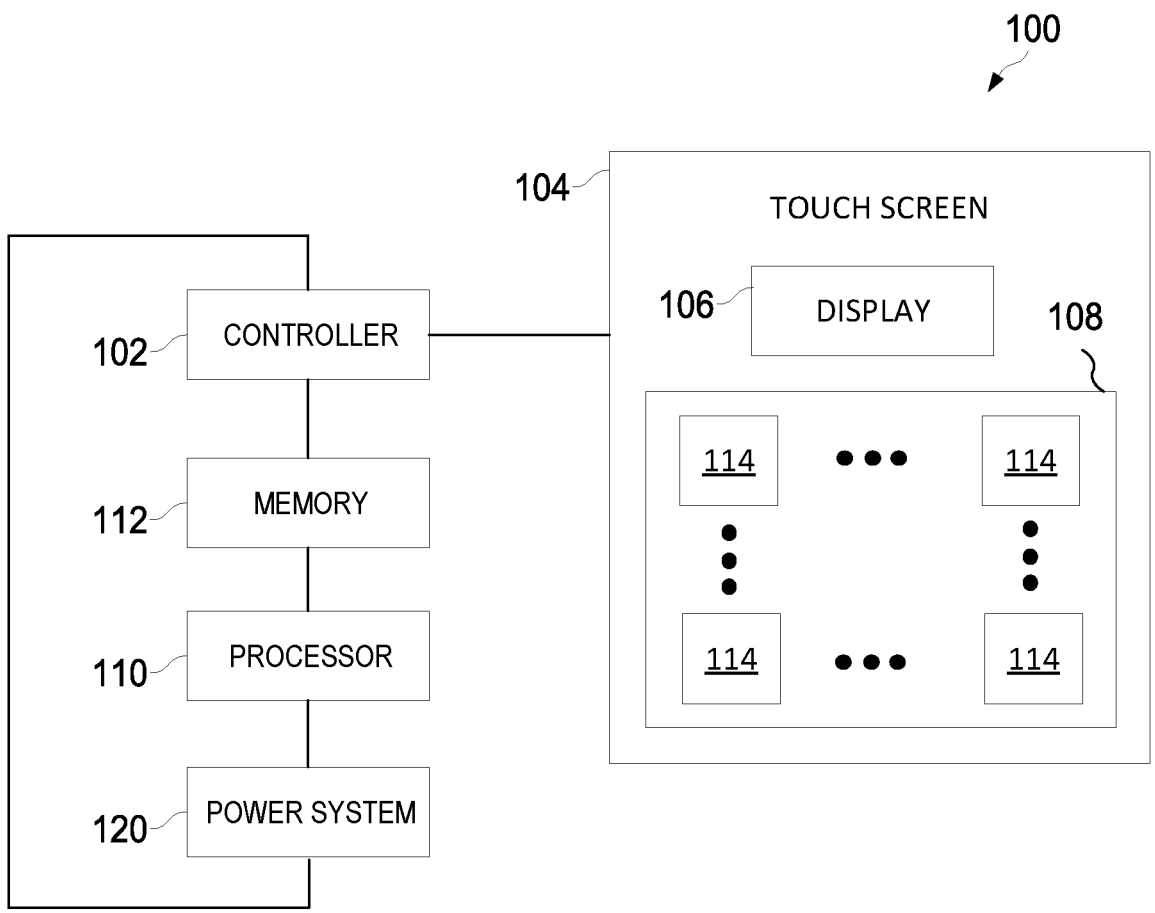
FIG. 1 is a block diagram of embodiment device.

FIG. 1 illustrates a block diagram of embodiment device 100. Device 100 includes a touch controller 102, a touchscreen 104, a memory 112, a processor 110, and a power system 120 which may (or may not) be arranged as shown. In embodiments, the touch controller 102 and the processor no may be implemented as a single processing unit. Device 100 may include additional components not depicted, such as long-term storage (e.g., non-volatile memory, etc.), additional input and output interfaces, speakers, or the like. In embodiments, device 100 is a smartphone, smartwatch, wearable device, tablet, laptop, or any other device that includes a grid-type sensor, such as a device with a touchscreen (e.g., a smart thermostat, a refrigerator, a car infotainment console, or the like).

In embodiments, during normal operation, touch controller 102 controls the operation of touchscreen 104. For example, in some embodiments, touch controller 102 receives raw input data from the touchscreen 104 to determine, for example, the location and the type of touch. Touch controller 102 may include an analog-to-digital converter (ADC)—not shown—to convert the analog signals from the touchscreen 104 to digital signals for further processing by touch controller 102. In embodiments, the ADC may be external to the touch controller 102. Touch controller 102 may be any component or collection of components adapted to perform computations or other processing-related tasks. In embodiments, touch controller 102 is arranged on a System-on-Chip (SoC). In embodiments, touch controller 102 may be implemented in any way known in the art.

Memory 112 may be any component or collection of components adapted to store programming or instructions for execution by touch controller 102. In an embodiment, memory 112 includes a non-transitory computer-readable medium. In some embodiments, memory 112 is part of processor 110. In some embodiments, memory 112 is external to processor 110, such as inside touch controller 102. Other implementations are also possible. In some embodiments, memory 112 may also be used for storing other types of data of device 100.

In embodiments, touchscreen 104 allows users to interact and communicate with the device 100. In embodiments, touchscreen 104 includes a display 106 and an array of sensors 108 (also referred to as a grid, a touch grid, touch cells, or sensing elements). Display 106 is configured to display images. In embodiments, a panel driver (not shown) may be coupled to the display 106 and the processor 110. The panel driver may be used to drive Display 106. Display 106 may be implemented in any way known in the art.

The array of sensors 108 includes a plurality of sensors 114 arranged in rows and columns. Sensors 114 and the array of sensors 108 may be implemented in any way known in the art. In embodiments, touchscreen 104 is a capacitive touchscreen.

Processor 11o is configured to operate device 100. In embodiments, processor 110 is implemented as a general-purpose or custom controller or processor coupled to memory 112 and configured to execute instructions from memory 112 or another memory of device 100. In embodiments, processor no may be coupled to a second memory of device 100, which stores the instructions to be executed by processor 110. In some embodiments, touch controller 102 is implemented as part of processor 110. In embodiments, processor 110 is a master processing unit, and touch controller 102 is a slave processing unit.

Power system 120 provides a power source for the operation and portability of device 100. Power system 120 may be a power management integrated circuit (PMIC). Power system 120 may include a controller, a battery, a charging circuit, an interface, and other components to allow inductive charging by transferring power from a charging pad or a base station to device 100. The power system 120 may be any component or collection of components that manage and control the distribution, conversion, and regulation of power in device 100. In various embodiments, power system 120 is configured to regulate supply voltage to various components of device 100 and control the charging, discharging, and monitoring of the operations of a battery.

Figure 2:
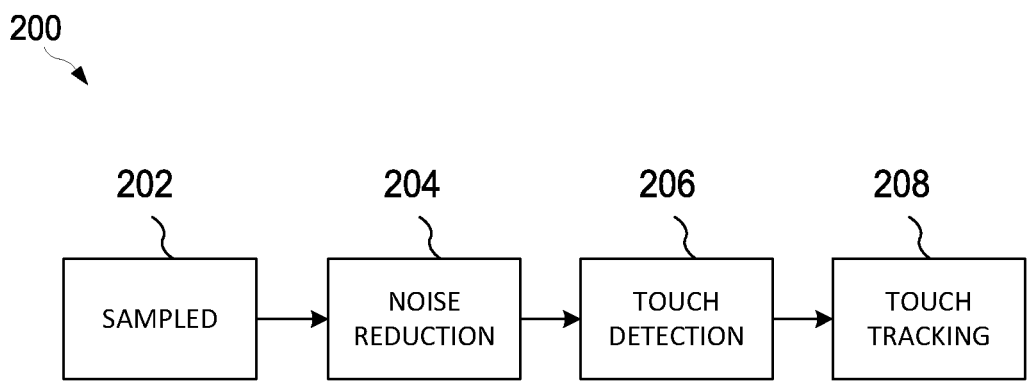
FIG. 2 is a flow chart of an embodiment method for analyzing input data.

FIG. 2 illustrates a flow chart of an embodiment method 200 for analyzing input data, as may be implemented in device 100. Generally, the raw data from the array of sensors 108 is converted (i.e., pre-processed) to data usable by touch controller 102 to determine and interpret interaction(s) with device 100 by a user. The conversion of data can include a combination of hardware and software algorithms.

At step 202, the input data is sampled by touch controller 102 from touchscreen 104. The sampling includes capturing, at a high frequency, as much information as possible about the interaction with sensors 114.

At step 204, the sampled data is processed for noise reduction to reduce noise in the input data and to improve the accuracy of, for example, the touch location. Generally, noise reduction is a core step in the preprocessing of input data from an array of sensors 108 because it helps to enhance the accuracy, for example, of touch detection and improve user experience. Noise reduction typically includes filtering, signal averaging, adaptive filtering, adaptive touch reporting delay, adaptive frame drop, or the like. Further, noise reduction can help improve system efficiency by maintaining the device 100 in idle mode instead of transitioning the device 100 to active mode in response to a noise signal characterized as a touch event without noise reduction.

Filtering typically involves passing the input data through a filter to remove high-frequency, low-frequency, or both type of components from the signal, smooth out the input data, and improve touch accuracy detection. Generally, signal averaging encompasses collecting multiple samples of the input data and averaging them together to lessen the influence of the noise on the final result. Although signal averaging can reduce random noise, it is generally ineffective in removing periodic noise.

Adaptive filtering, adaptive touch reporting delay, and adaptive frame drop commonly involve using an algorithm and computational resources to identify and remove complex or variable noise by adapting to the input data.

Generally, sensing of the touchscreen 104 is not time synchronized with the driving of display 106. A user can be touching the touchscreen 104 and the display 106 may be driven at the same time or the user can be touching the touchscreen 104 while the display may not be driven. Thus, at times, the raw input data from the array of sensors 108 may include noise from the display 106 driving solution. In embodiments where the touchscreen 104 and the display 106 operate at a different frequency or time domain, the effect of the noise from the display 106 driving solution can be minimal; however, the associated noise may still be included in the raw input data.

Another type of noise that may be included in the raw input data is noise color (e.g., grey, zebra with one on and one off, zebra with two on and two off, and the like). Yet another type of noise that may be included in the raw input data is noise from, for example, a charging circuit or a wireless charger. In embodiments, the associated noise in the frequency domain can be dense and intense. In embodiments, the associated noise can be more significant than the noise from the driving solution. Embodiments of this disclosure remove or significantly reduce the noise in the raw input data before analysis of, for example, the touch detection (step 206) and touch tracking (step 208). By doing so, the device 100 operates more efficiently in active and idle modes. Further, device 100 will remain in idle mode and consume less power due to the improvement in touch detection.

At step 206, touch controller 102 processes the filtered data for touch detection to detect the presence of, for example, touch and estimate the location of the touch on the screen. Various algorithms may be used to find the best match by, for example, comparing the input data to a set of pre-defined touch patterns or templates.

At step 208, touch controller 102 processes the filtered data for touch tracking, such that the location and movement over time are tracked to determine the type of touch, such as a tap, pinch, swipe, or the like. The information is used to initiate by, for example, processor 110 an appropriate response from device 100.

Figure 3:
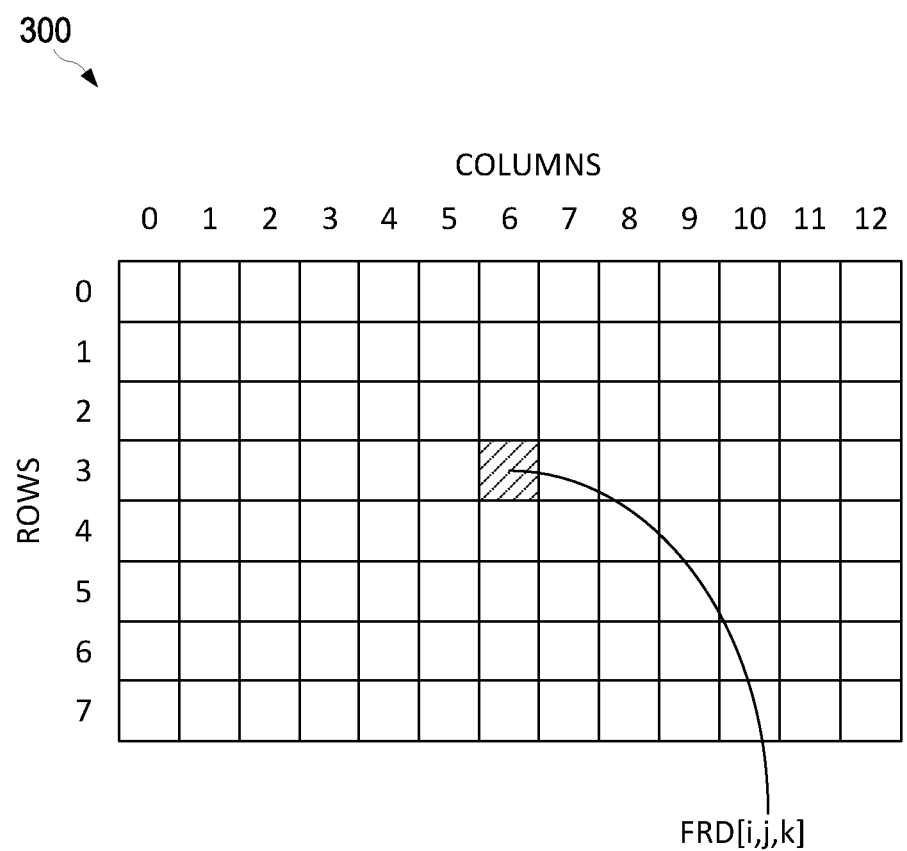
FIG. 3 is a representation of an embodiment raw data frame matrix captured at time k from the array of sensors.

FIG. 3 illustrates a representation of an embodiment raw data frame matrix 300 captured at time k from the array of sensors 108. The raw data frame matrix 300 is shown as an array with 13 columns and 8 rows. However, it is noted that the number of columns and rows is non-limiting, and greater or fewer numbers are similarly contemplated.

A sample data point of the raw data frame matrix 300 is represented as FRD [i, j, k], where i is the row number, j is the column number, and k is the sampling time instant. For example, a sample data point collected at time instant k, from a sensor 114 located at column 5 and row 6 is represented as FRD [6, 5, k]. As another example, a sample data point collected at time instant k+1, collected from a sensor 114 located at column 4 and row 2 is represented as FRD [2, 4, k+1].

In embodiments, a machine learning filtering technique is provided that lowers the processing time and power consumption of touch controller 102, while maintaining the filtering performance of noise in a frame dataset (e.g., data corresponding to the array of sensors 108 at instant time k).

A machine learning filtering technique is a method used to select a subset of data from a larger dataset for use in a machine learning algorithm. The goal of the filtering is to improve the algorithm's performance by reducing the amount of noise or irrelevant data in the dataset. There are several different filtering techniques, such as feature selection and instance selection, that can be used for this purpose. These techniques can be applied before or during training to help the algorithm learn more effectively from the data. The machine learning filtering technique can be embodied in the firmware of touch controller 102 or stored as instructions in memory 112 and executable by touch controller 102.

In embodiments, the machine learning filtering technique is applied during the regression analysis of a linear model to extract coefficients of a respective row of sampling data of a polynomial regression model in real time.

Machine learning involves the use of computer algorithms that have the capability to enhance autonomously through experience and utilization of data. The algorithms in machine learning construct a model utilizing sample data, referred to as training data, to make predictions or determinations without the need for explicit programming to perform such tasks. In embodiments, the training of threshold values for the analysis is completed offline based on machine learning.

In embodiments, a method of building a regression analysis model from the sampled data is proposed. In embodiments, the regression analysis model is used to determine a property of the sampled data using a high-dimensional polynomial regression model.

Generally, regression analysis is a statistical method for studying the relationship between a dependent variable and one or more independent variables. Regression analysis serves mainly two distinct conceptual purposes. Firstly, it is extensively employed for prediction and forecasting, and in this context, it significantly intersects with the field of machine learning. Secondly, regression analysis can, in certain circumstances, be utilized to deduce causal relationships between the independent and dependent variables.

In embodiments, relationships between no touch, touch, and noise are predicted and estimated by analyzing the properties of the sampled data. In embodiments, an adaptive frame filtering technique is disclosed for selecting a specific filtering technique best suited to the data based on the predictions and analysis. This contrasts with the conventional frame filtering process solutions, which use the same filtering technique or model for all data points across different frames.

Figure 4:
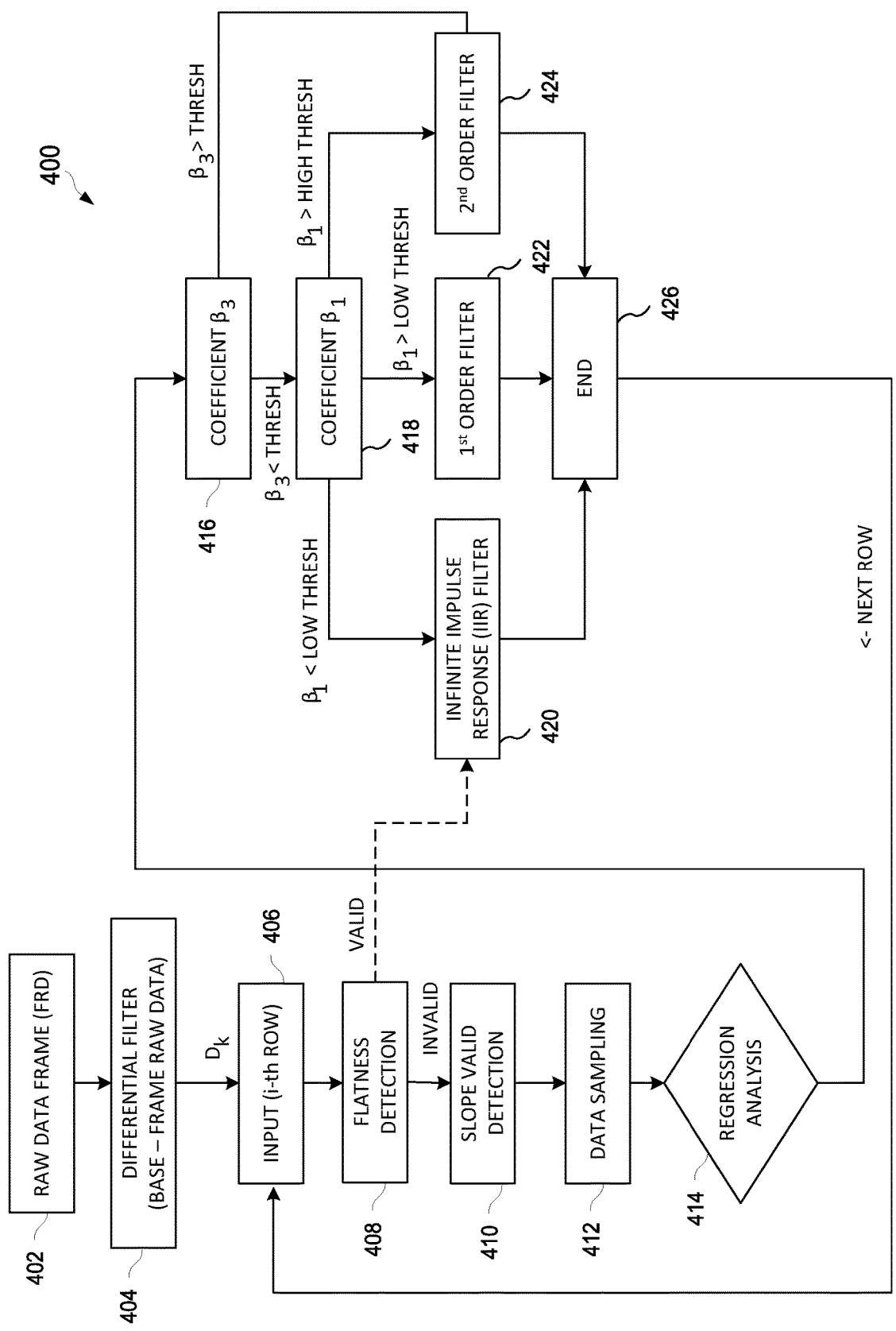
FIG. 4 is a flow chart of an embodiment method for processing raw data from the array of sensors.

FIG. 4 illustrates a flow chart of an embodiment method 400 for processing raw data from the array of sensors 108, such as from a capacitive touchscreen based on an adaptive frame filtering technique. In embodiments, method 400 is implemented in touch controller 102 or processor 110. In embodiments, the adaptive frame filtering technique is implemented in idle mode. In such embodiments, the adaptive frame filtering technique is implemented on the raw data input collected using self-capacitive sensing. In embodiments, the adaptive frame filtering technique is implemented in active mode. In such embodiments, the adaptive frame filtering technique is implemented on the raw data input collected using mutual capacitive sensing and self-capacitive sensing.

At step 402, during the sampling phase from step 202, raw input data is sampled by touch controller 102 from touchscreen 104. The raw input data includes a time component, identified herein as time instant k. For example, the raw input data from the array of sensors 108 at a first instant can be represented as $FRD_k$. Likewise, at a second instant immediately after the first instant, the raw input data from the array of sensors 108 can be represented as $FRD_{k+1}$.

At step 404, a differential filter calculation is applied to the raw input data. The differential filter calculation includes subtracting the raw input data at a specific instant in time from a baseline measurement. In embodiments, the baseline measurement corresponds to an average of raw input data measurements or samples from the array of sensors 108 at different instance in time and where the user is not interacting with the touchscreen 104.

In an embodiment, the value of the baseline measurement, based on M number of sampled measurements (i.e., time instances) from the array of sensors 108, is computed using $$\text{Baseline} = \frac{FRD_1 + FRD_2 + \ldots + FRD_M}{M},$$

where M is a positive integer number.

In embodiments, each raw input data is in the form of a matrix. In such embodiments, the baseline measurement value is in the form of a matrix. Thus, each row and column of the raw input data from each sensor 114 is subtracted from the corresponding row and column of the baseline measurement to provide a differentially filtered input data (D), in the form of a matrix.

In embodiments, the baseline measurement is a single value applied to the raw input data collected from all sensors 114. In embodiments, the baseline measurement is a single value for each column or row of the array of sensors 108.

In embodiments, the baseline computation represents the normal state of the touchscreen 104 (i.e., sensing element, sensor) in the absence of touch. In embodiments, the sampled measurements are consecutive sampling time instants. In embodiments, the baseline computation is a value stored in memory 112. In embodiments, the baseline computation is a measurement performed at the factory, for example, where device 100 or touchscreen 104 is built. In embodiments, the baseline computation is a measurement performed at an initial startup of device 100. In embodiments, the baseline computation is a measurement performed before or after a user touches the touchscreen 104. In embodiments, the baseline value is refreshed in response to detecting a change, for example, in the environment by one or more sensors (e.g., sensors of device 100 different than the sensors of the touchscreen) of the device 100. In each of these embodiments, the measurements to calculate the baseline measurement are collected without touch or interaction by the user with the device 100 or touchscreen 104.

Thus, at step 404, the raw input data goes through an initial noise reduction step to remove the influence of constant noise data from the raw input data and generate the differentially filtered input data (D). In embodiments, additional or alternative noise reduction step(s) to step 404 are applied to the raw input data in any way known in the art.

At step 406, once the raw input data goes through an initial noise reduction step at step 404, the differentially filtered input data (D), corresponding to a particular row, is analyzed from steps 408 through 418 to determine the particular type of filter transform (infinite impulse response (IIR) filtering at step 420, first-order filtering at step 422, or second-order filtering at step 424) is to be applied for that particular row.

At step 408, a flat detection analysis is performed on the differentially filtered input data (D) for a respective row of the array of sensors 108. The flat detection analysis computes a flatness detection matrix (FD[i, j, k]) having values equal to a difference between an absolute value for each element of the differentially filtered input data (D) for the particular row with a flatness threshold: FD[i, j, k]=abs(D[i, j, k])−flatness_threshold, where FD[i,j,k] is the flat detection matrix, D[i,j,k] is the differentially filtered input data, and flatness_threshold is the flatness threshold value.

In embodiments, the flatness_threshold has a single value. In embodiments, the flatness_threshold is a matrix. In embodiments, the flatness_threshold is determined by collecting an average of the maximum absolute values of the differentially filtered input data ($D_k$) over several time instances (frames) corresponding to a no touch and known noise effects, such as a test on pure black, pure white, or both type of image screens.

In response to any of the elements of the flat detection matrix (FD[i,j,k]) being greater than zero (i.e., the absolute value of the differentially filtered input data for the particular row being greater than the flatness threshold), the entirety of the respective row is marked as invalid (i.e., the respective row has no flatness) and the method continues at step 410.

If, however, all elements of the flat detection matrix (FD[i,j,k]) are less than zero (i.e., the absolute value of the differentially filtered input data for the particular row is less than the flatness threshold), the entirety of the respective row is marked as valid (i.e., the respective row has flatness) and the method continues at step 420—detailed further below.

A valid flatness determination at step 408 means that there are no touch and no noise effects at the sensors of the row under analysis. Marking the respective row as valid indicates that no interaction is made with any sensor on the row under analysis; thus, the data is less affected by noise. Conversely, marking the respective row as invalid indicates that some interaction is made with at least one sensor on the row under analysis; thus, the data is affected by touch or noise.

In response to making a valid flatness determination at step 408, no regression analysis or sampling of the data is required. It should be noted that other algorithms and comparisons to determine a valid or an invalid determination are also contemplated.

In response to the invalid flatness determination at step 408, at steps 410 and 412, an updated data set (data sampling matrix DS) for the row under analysis is generated by selectively discarding cells of the differentially filtered input data (D) such that the regression analysis at steps 414, 422, and 424 have a smaller error in the residual sum of squares.

The use of the data sampling matrix DS, instead of the differentially filtered input data ($D_k$), improves the issue of overfitting corresponding to an error in the residual sum of squares (RSS) at steps 414, 422, and 424—RSS[i, k]=$\Sigma_{j=0}^{N-1}$O[i, j, k]$^2$, where N is the number of columns. In statistics, the estimation error is a measure of a discrepancy between data and an estimation model, and a small residual sum of squares value indicates a good fit of the model to the data. The use of the data sampling matrix, thus, helps to reduce the residual sum of squares value, which improves the accuracy of the results of coefficients of the model and in fitting the model to the data.

Initially, at step 410, a slope value analysis is performed in response to determining an invalid detection at step 408. The slope value analysis computes an absolute value of the difference between each consecutive sample of the differentially filtered input data ($D_k$) for the respective row. The slope value computation can be represented by the equation: SLP[i, j, k]=abs(D[i, j, k]−D[i, j−1, k]), where SLP[i,j,k] is the slope value computation for the sensor located at column i, row j, at instant time k; where D[i,j,k] is the differentially filtered input data from the sensor located at column i, row j, at instant time k; and where D[i,j−1,k] is the differentially filtered input data from the sensor located at column i, row j−1 (adjacent sensor), at instant time k.

It is understood that, in embodiments, the slope value computation for the first cell of the respective row is not calculated because, other than the second adjacent sensor, there is no other adjacent sensor to the first sensor.

Further, at step 410, once the slope value is computed, the slope value computed for each cell of the respective row is compared against a high-sensitivity response threshold to make a slope valid determination. A valid state indicates an interaction (e.g., touch or noise effect) with a particular sensor of the row under analysis whereas an invalid state indicates a non-interaction (e.g., no touch) with the particular sensor.

An appropriate slug touch at multiple sensors is used in embodiments to determine the high-sensitivity response threshold. In embodiments, the slug touch is a four-millimeter slug touch. In embodiments, the slug touch is at the center of four sensor areas.

At step 412, a data sampling matrix DS, representing the results of the validity check (i.e., D[i,j,k] or "1") for the corresponding sensor in the respective row, is generated-based on the results of the slope validation detection at step 410. The data sampling matrix represents the results of the slope value comparison with the high-sensitivity response threshold, which can be represented as DS[i, j, k]=(SLP[i, j, k]<high sensitivity response threshold)?D[i,j,k]: 1. Thus, the value of the data sampling matrix DS[i,j,k] is represented with a "1" where the SLP[i,j,k] has a value greater than the high-sensitivity response threshold at the corresponding column i and row j at time instant k; otherwise, the value of DS[i,j,k] is equal to the value of D[i,j,k].

For example, if the value of SLP[5, 2,k] is greater than the high-sensitivity response threshold, the value of DS[5,2,k] is a "1"; otherwise, the value of DS[5,2,k] is equal to "D[5,2, k]".

The data sampling matrix DS is a 1 by j (number of columns) matrix based on the results of the slope validation detection at step 410. The values of the cells of the data sampling matrix DS are subsequently updated by extending a value of "1" to adjacent locations (i.e., DS[i,j−1,k] and DS[i,j+1,k]) where the original DS[i,j,k] value equaled "1".

At step 414, a regression analysis based on, for example, a third-degree polynomial regression model is applied to the updated sampling matrix DS from step 412. A third-degree polynomial regression model is in the form of: $y_j = \beta_0 + \beta_1 x_j + \beta_2 x_j^2 + \beta_3 x_j^3$, where the time series x={1, 2, ..., n} is the independent variable of the regression model and is assumed to have n number of data samples. The vector (i.e., unknown parameters of the regression model) of the estimated polynomial regression coefficients using linear least squares estimation is: $\vec{\beta} = (X^T X)^{-1} X^T \vec{y}$. The vector of the third-order polynomial regression coefficients is:

$$\hat{\beta} = \left( \begin{bmatrix} 1 & 1 & 1^2 & 1^3 \\ 1 & 2 & 2^2 & 2^3 \\ 1 & 3 & 3^2 & 3^3 \\ \vdots & \vdots & \vdots & \vdots \\ 1 & n & n^2 & n^3 \end{bmatrix}^T \begin{bmatrix} 1 & 1 & 1^2 & 1^3 \\ 1 & 2 & 2^2 & 2^3 \\ 1 & 3 & 3^2 & 3^3 \\ \vdots & \vdots & \vdots & \vdots \\ 1 & n & n^2 & n^3 \end{bmatrix} \right)^{-1} \begin{bmatrix} 1 & 1 & 1^2 & 1^3 \\ 1 & 2 & 2^2 & 2^3 \\ 1 & 3 & 3^2 & 3^3 \\ \vdots & \vdots & \vdots & \vdots \\ 1 & n & n^2 & n^3 \end{bmatrix}^T \vec{y},$$

where $\vec{y}$ corresponds to the updated data sampling matrix of the respective row from step 412.

It is noted that other types of algorithms, such as a K-degree polynomial regression model can be applied, at step 414, to the updated sampling matrix DS from 412. A K-degree polynomial regression model is in the form of: $y_j = \Sigma_{i=0}^{k} \beta_i x_j^i$, where the time series x={1, 2, ..., n} is the independent variable of the regression model and is assumed to have n number of data samples. The vector (i.e., unknown parameters of the regression model) of the estimated polynomial regression coefficients using linear least squares estimation is: $\vec{\beta}=(X^TX)^{-1}X^T\vec{y}$. The vector of the K-order polynomial regression coefficients is:

$$\hat{\beta} = \left(\begin{bmatrix} 1 & 1 & 1^2 & \cdots & 1^k \\ 1 & 2 & 2^2 & \cdots & 2^k \\ 1 & 3 & 3^2 & \cdots & 3^k \\ \vdots & \vdots & \vdots & \ddots & \vdots \\ 1 & n & n^2 & \cdots & n^k \end{bmatrix}^T \begin{bmatrix} 1 & 1 & 1^2 & \cdots & 1^k \\ 1 & 2 & 2^2 & \cdots & 2^k \\ 1 & 3 & 3^2 & \cdots & 3^k \\ \vdots & \vdots & \vdots & \ddots & \vdots \\ 1 & n & n^2 & \cdots & n^k \end{bmatrix}\right)^{-1} \begin{bmatrix} 1 & 1 & 1^2 & \cdots & 1^k \\ 1 & 2 & 2^2 & \cdots & 2^k \\ 1 & 3 & 3^2 & \cdots & 3^k \\ \vdots & \vdots & \vdots & \ddots & \vdots \\ 1 & n & n^2 & \cdots & n^k \end{bmatrix}^T \vec{y},$$

where $\vec{y}$ corresponds to the updated data sampling matrix of the respective row from step 412.

Thus, although the embodiments of this disclosure are described in accordance with a third-degree polynomial, it is noted that, for example, higher-order polynomial coefficients can similarly be chosen to achieve better performance. Generally, a higher-order polynomial model can provide a better fit for a dataset as the associated error value of the estimation is reduced as the degree of the polynomial increases. The reduction in the error value improves the noise reduction efficacy. However, as the degree of the polynomial increases, the associated computation time and analytic complexity also increase. Selecting a balance between the degree of the polynomial and process speed is, thus, advantageous.

The estimation results (regression analysis) on the updated data sampling matrix of the respective row from step 412 are coefficients (i.e., parameters) $\beta_0$, $\beta_1$, $\beta_2$, and $\beta_3$ of the respective row at the time instant k. In embodiments, the coefficients $\beta_3$ and $\beta_1$ are used to determine the appropriate type of filter transform to be applied to the respective row of the data sampling (DS) matrix under analysis. In embodiments, the absolute value of the coefficients $\beta_3$ and $\beta_1$ are used to determine the appropriate type of filter transform to be applied to the respective row of the data sampling (DS) matrix under analysis. Using the absolute value of coefficients, in embodiments, can provide better predictive detection for noise cancellation.

In embodiments, threshold values are determined in accordance with machine learning concepts of regression analysis for the purposes of prediction analysis marking different thresholds for touch, no touch, or noisy conditions. Thus, the threshold values are calculated offline while the coefficients for the respective row at time instant k are calculated in real time. In embodiments, machine learning concepts can be used to determine threshold values in the presence of noise and adaptable to various noise conditions and models.

In embodiments, to determine the threshold values to be compared with the absolute value of the coefficients $\beta_3$ and $\beta_1$, different noise models are used to determine a range of values for the absolute value of the coefficients $\beta_3$ and $\beta_1$. The range of values for the absolute value of the coefficients $\beta_3$ and $\beta_1$ are then used to train data to determine a first threshold, a second threshold, and a third threshold. The first, second, and third thresholds are subsequently compared with the coefficients to determine the type of filter transform, as disclosed further below.

In embodiments, an infinite impulse response (IIR) filtering transform, a first-order filter transform, or a second-order filter transform is applied to the respective row of the data sampling (DS) matrix to generate an output matrix $O_k$ for the respective row based on a comparison between the absolute value of the coefficients $\beta_3$ and $\beta_1$ and the threshold values generated using machine learning.

In embodiments, the determination of the range of values for the absolute value of the coefficients $\beta_3$ and $\beta_1$ and the training of data to determine the first, second, and third thresholds are performed during the engineering/design phase of the manufacturing, and the values are stored in memory 112. In embodiments, the values are updated by, for example, downloading values from the cloud, a website, a server, or the like.

If the absolute value of the coefficient $\beta_3$ is greater than the first threshold, a second-order filter transform is applied to the respective row of the data sampling (DS) matrix to generate a corresponding output matrix ($O_k$) at step 424—further detailed below. However, if the absolute value of the coefficient $\beta_3$ is less than the first threshold, the absolute value of the coefficient $\beta_1$ is instead used to determine the appropriate type of filter transform to be applied.

At step 420, in response to the value of the absolute value of the coefficient $\beta_1$ of the third-order polynomial regression being below the second threshold or a valid flatness detection determination at step 410, at step 420, an infinite impulse response (IIR) filter transform is applied to the respective row of the $D_k$ matrix:

$$FFD[i, j, k] = (\text{INVALID NODE})?\left(\frac{D[i, j, k]}{div_{threshold}}\right): D[i, j, k],$$

where $y[n]=\Sigma_{k=0}^{M} b_k x(n-k)+\Sigma_{k=1}^{N} a_k y(n-k)$, M=0, $a_1=0$, $b_0=1/\text{div\_threshold}$.

Assuming a simplified IIR filter as $y[n]=b_0 x(n)+a_1 y(n-1)$, where M=0, N=1, $a_1=0$, $b_0=1/\text{div\_threshold}$ (i.e., $y[n]=\text{box}(n)$). The value of div_threshold can be, for example, the values of 2, 4, 8, or 16-depending on the product.

When a valid flatness detection determination is made at step 410, the IIR filter uses the differentially filtered input data ($D_k$) for the row under analysis at step 420 for the filter transform—as shown in the equation above. However, if the process at step 420 results from a determination that the value of the absolute value of the coefficient $\beta_1$ of the third-order polynomial regression is below the second threshold, the filter transform at step 420 uses the updated data sampling (DS) matrix for the row under analysis from step 412 (i.e., replace $D_k$ with DS in the equation above).

Generally, an infinite impulse response filter transform requires minimal processing computations. Thus, it would be advantageous to use a low computation algorithm for data corresponding to, for example, a no touch condition. A corresponding output matrix ($O_k$) for the respective row is generated from the infinite impulse response filter transform: O[i, j, k]=FFD[i, j, k]. The output matrix indicates the strength of the touch for the sensors associated with the respective row under analysis.

At step 422, in response to the value of the absolute value of the coefficient $\beta_1$ of the third-order polynomial regression being greater than the second threshold, a first-order filter transform is applied to the respective row of the updated data sampling (DS) matrix from step 412: $FFD[i, j, k]=\beta_0+\beta_1 \times j$.

In embodiments, the first-order filter transform is a first-order polynomial filter. In embodiments, the first-order filter transform is a first-order linear line filter.

The coefficients of the first-order polynomial filter are generated from the data sampling (DS) matrix of the respective row. The vector of the first-order polynomial regression coefficients being:

$$\hat{\vec{\beta}} = \left( \begin{bmatrix} 1 & 1 \\ 1 & 2 \\ 1 & 3 \\ \vdots & \vdots \\ 1 & n \end{bmatrix}^T \begin{bmatrix} 1 & 1 \\ 1 & 2 \\ 1 & 3 \\ \vdots & \vdots \\ 1 & n \end{bmatrix} \right)^{-1} \begin{bmatrix} 1 & 1 \\ 1 & 2 \\ 1 & 3 \\ \vdots & \vdots \\ 1 & n \end{bmatrix}^T \vec{y},$$

where $\vec{y}$ is data sampling (DS) matrix of the respective row from step 412.

A corresponding output matrix ($O_k$) for the respective row is generated from the first order filter transform: O[i, j, k]=D[i, j, k]−FFD[i, j+1, k].

At step 424, in response to the value of the absolute value of the coefficient $\beta_1$ of the third-order polynomial regression being greater than a third threshold, a second-order filter transform is applied to the respective row of the updated data sampling (DS) matrix from step 412: FFD[i, j, k]=$\beta_0$+$\beta_1$×j+$\beta_2$×j$^2$.

In embodiments, the second-order filter transform is a second-order polynomial filter. In embodiments, the second-order filter transform is a second-order curve fit filter. The coefficients of the second-order polynomial filter are generated from the data sampling (DS) matrix of the respective row. The vector of the second-order polynomial regression coefficients being:

$$\hat{\vec{\beta}} = \left( \begin{bmatrix} 1 & 1 & 1^2 \\ 1 & 2 & 2^2 \\ 1 & 3 & 3^2 \\ \vdots & \vdots & \vdots \\ 1 & n & n^2 \end{bmatrix}^T \begin{bmatrix} 1 & 1 & 1^2 \\ 1 & 2 & 2^2 \\ 1 & 3 & 3^2 \\ \vdots & \vdots & \vdots \\ 1 & n & n^2 \end{bmatrix} \right)^{-1} \begin{bmatrix} 1 & 1 & 1^2 \\ 1 & 2 & 2^2 \\ 1 & 3 & 3^2 \\ \vdots & \vdots & \vdots \\ 1 & n & n^2 \end{bmatrix}^T \vec{y},$$

where $\vec{y}$ is data sampling (DS) matrix of the respective row from step 412.

A corresponding output matrix ($O_k$) for the respective row is generated from the second-order filter transform: O[i, j, k]=D[i, j, k]−FFD[i, j+1, k].

At step 426, once the appropriate filter transform is applied to the respective row of the $D_k$ matrix, and a corresponding output matrix $O_k$ is generated for the respective row, steps 408 through 426 are repeated (starting from step 406) for the next row until all rows have been analyzed and a complete output matrix O[i,j,k] is generated.

Once a complete output matrix O[i,j,k] has been generated, it is used, by touch controller 102, to determine, for example, a corresponding touch detection, as detailed in step 206, a corresponding touch tracking, as detailed in step 208, or a combination thereof, at time instant k.

It is noted that the filter transform is applied spatially regardless of the type of filtering applied. Thus, the only data being filtered to generate the output matrix for the particular row under analysis belong to the same frame (same instant of time).

Figure 5:
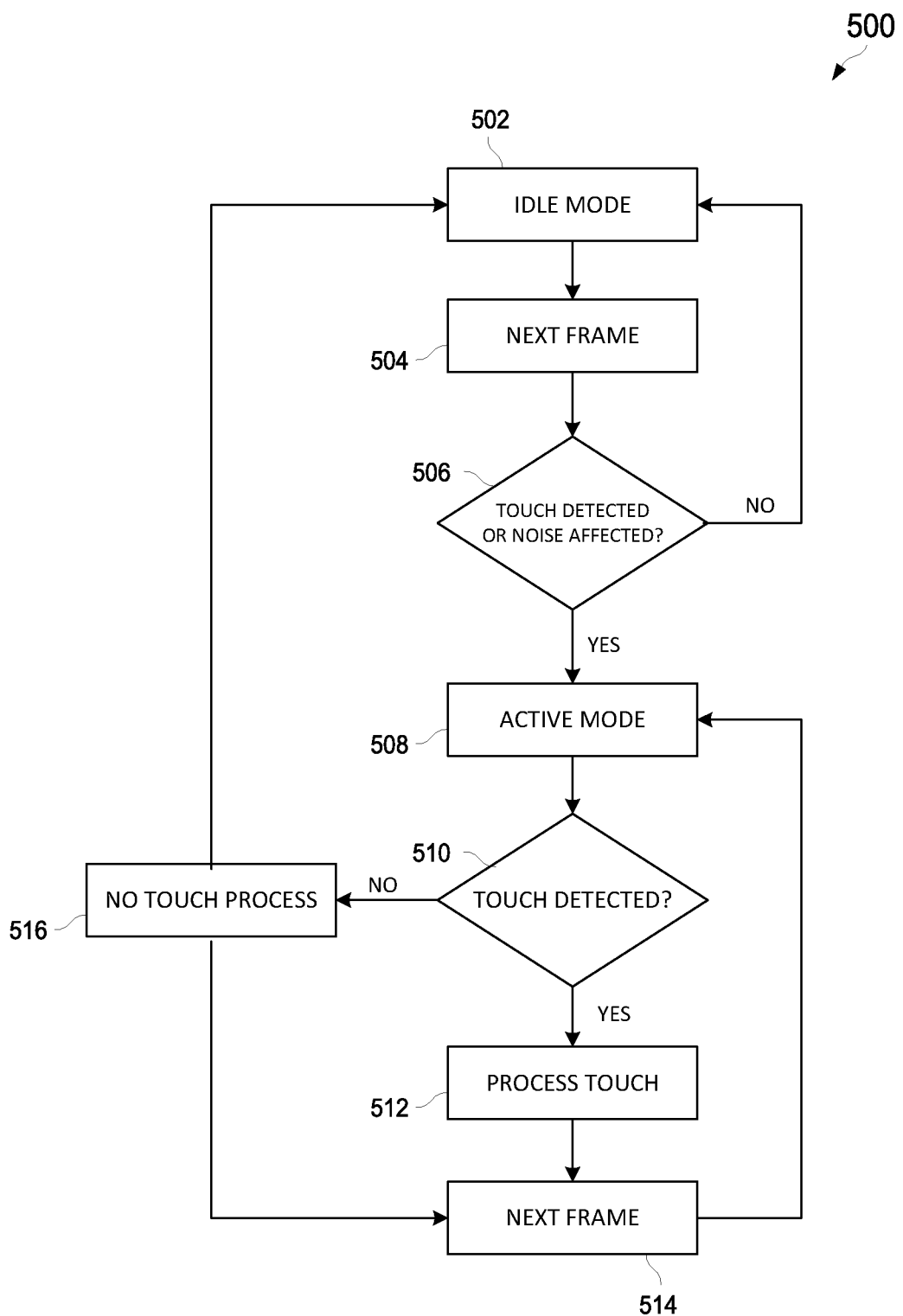
FIG. 5 is a flow chart of an embodiment method of a conventional approach for the transitioning between idle mode and active mode.

FIG. 5 illustrates a flow chart of an embodiment method 500 of a conventional approach for the transitioning between idle mode and active mode in device 100. Generally, when device 100 operates in idle mode, certain functionalities are restricted, such as the touchscreen 104, to conserve energy while allowing the user to view content like videos. During this idle mode, while the user can watch the video and see the display, any attempts to interact via the touchscreen 104 will be unresponsive as the touch process is inactive. This allows the user to consume content passively, with minimized risk of unintentional interactions with the touchscreen 104, and it helps extend the battery life of the device 100.

However, device 100 transitions from the idle mode to the active mode in response to user interaction with the touchscreen 104 in subsequent frames. This means, that when the user touches the touchscreen 104, touch controller 102 recognizes this interaction and activates the touch interface in, for example, the subsequent frame, enabling the user to interact with the device 100 normally. This transition ensures a seamless user experience, allowing users to interact with the device 100 whenever needed, while still benefiting from energy conservation during the idle mode.

At step 502, device 100 is operating in idle mode. In idle mode, the touchscreen 104 may still show an image or video on the display 106, but the touchscreen feature may be non-functional. This implies that during the frame being displayed, even if users can view the display, any attempt to interact with it through high-sensitivity touch will be unresponsive (for that frame). In such a condition, the device 100 is in a power-conservation mode, preserving energy by restricting the operations of the touchscreen interface.

For example, when a user watches a video lecture on a tablet with idle mode enabled, the user can continue to watch the lecture and listen to the audio, but if they try to touch the screen during that frame by fast swipe and to navigate through the video, those touches will not register.

At step 504, the touchscreen 104 transitions to the next frame. Generally, touchscreen circuits utilize two sensing methods for detecting touch: mutual capacitive sensing and self-capacitive sensing. Mutual capacitive sensing, or mutual sensing data, refers to a touchscreen technology where touch detection is based on the mutual capacitance between the driving (transmitting) and sensing (receiving) electrodes. In this system, a grid of electrodes is used, and the capacitance is measured at each grid intersection. When a finger approaches or touches the touchscreen 104, it interferes with the electric field between the electrodes, changing the mutual capacitance at that point, which is then detected by the system.

The primary advantage of mutual capacitive sensing is its ability to detect and track multiple touch points accurately, allowing for advanced multi-touch functionalities. It is widely used in modern touchscreens due to its high resolution and precision in detecting touch inputs, making it suitable for applications requiring complex gestures and interactions.

Conversely, self-capacitive sensing, or self-sensing data, involves detecting touch based on the change in capacitance of individual electrodes. In this method, the capacitance is measured between each electrode and the ground. When a finger is near or touching the screen, it acts as a conductive object, altering the self-capacitance of the electrode, which the system recognizes as a touch.

While self-capacitive sensing is simpler and less expensive to implement, it typically struggles with accurately detecting multiple simultaneous touch points compared to mutual capacitive sensing. However, it excels in applications where simple touch interactions are sufficient, and cost-effectiveness is a priority.

During idle mode, to preserve power, touchscreen 104 operates only in self-capacitive sensing type of sensing. At step 506, device 100 determines, based on self-capacitive sensing, whether a touch is detected on the touchscreen 104 or whether noise, exceeding a threshold, provides a signal that has the profile of a touch. In response to the system not detecting touch or noise not exceeding the threshold, device 100 remains in idle mode for the next frame.

At step 508, device 100 transitions from the idle mode to the active mode for the frame in response to the system detecting the touch or the noise exceeding the threshold.

At step 510, device 100 determines, based on mutual capacitive sensing and self-sensing, whether a touch is detected on the touchscreen 104. Once in active mode, where the touchscreen 104 is fully operational and responsive to touch inputs, device 100 will operate under the mutual capacitive sensing method and the self-sensing method for the next frame.

At step 512, in response to device 100 detecting the touch for the frame, touchscreen 104 properly processes the touch interaction by the user on the touchscreen 104 for the current scan frame. At step 514, the touchscreen 104 transitions to the next scan frame, while remaining in active mode. Steps 508 and 510 are repeated for the next scan frame.

At step 516, if a no touch event is detected over a threshold period (e.g., passing 300 to 500 ms without detecting a touch event in active mode) or after scanning a threshold number of scan frames continuously device 100 will revert to idle mode at step 502 to conserve power and resources, maintaining efficiency in operation. Typically, the device 100 remains in active mode and multiple frames are analyzed for a touch event detection (i.e., step 510 is repeated for multiple frames) until the threshold period or number of scan frames has been exceeded. Once the threshold has been exceeded, the device is in idle mode.

In embodiments, the scan rate for the idle mode is less than the scan rate for the active mode. For example, in idle mode, touchscreen 104 has a scan rate of 120 Hz, which results in self-sensing reporting a response every 8.3 ms. In active mode, touchscreen 104 has a scan rate of 240 Hz, which results in self-sensing and mutual capacitive sensing reporting a response every 4.16 ms.

Figure 6:
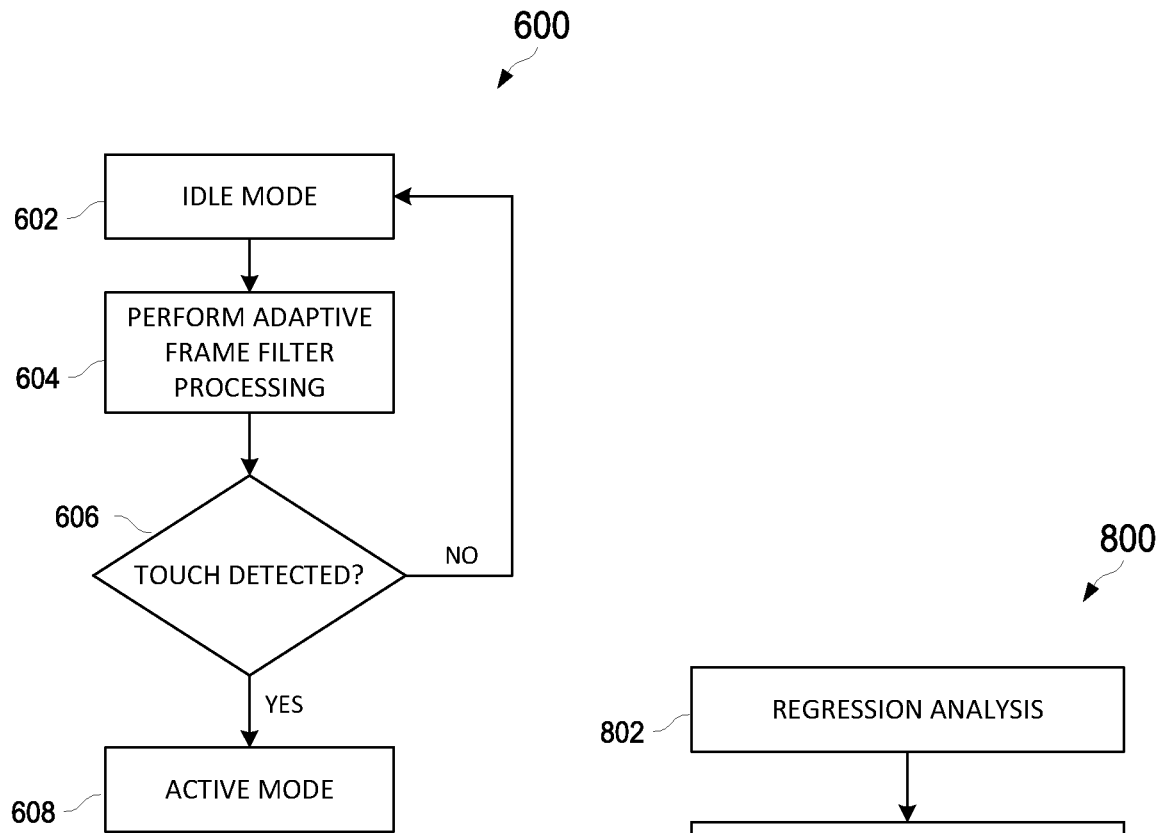
FIG. 6 is a flow chart of an embodiment method for operating a touchscreen in idle mode and determining when to transition to active mode.

FIG. 6 illustrates a flow chart of an embodiment method 600 for operating touchscreen 104 in idle mode and determining when to transition to active mode. At step 602, device 100 is initially operating in idle mode. At step 604, an adaptive frame filter processing in accordance with method 400, as described herein with respect to FIG. 4, is used to determine what type of filtering to be used on the raw data for the current frame.

Adaptive frame filter processing is implemented on each row (or column) of the current frame while device 100 is in idle mode. Based on the adaptive frame filter processing, the type of filtering that is determined is applied to the raw data and a modified set of data is generated. In embodiments, the adaptive frame filter processing is applied to the raw data input collected using self-capacitive sensing during the idle mode.

At step 606, the device 100 determines whether a touch event occurred based on the modified set of data as a result of the filtering type determined at step 604 using the adaptive frame filter processing. In embodiments, the thresholds used to determine which type of filtering to apply to the raw data using adaptive frame filter processing are determined based on machine learning.

Advantageously, by using method 600 to detect a touch event during idle mode, device 100 operates with greater accuracy, which minimizes false transitions from idle to active mode based on noise.

At step 608, in response to detecting a touch event at step 606 based on the modified set of data using adaptive frame filter processing, device 100 transitions from idle to active mode. However, in response to not detecting a touch event at step 608 based on the modified set of data using adaptive frame filter processing, the device remains in idle mode for the next scan frame.

Figure 7:
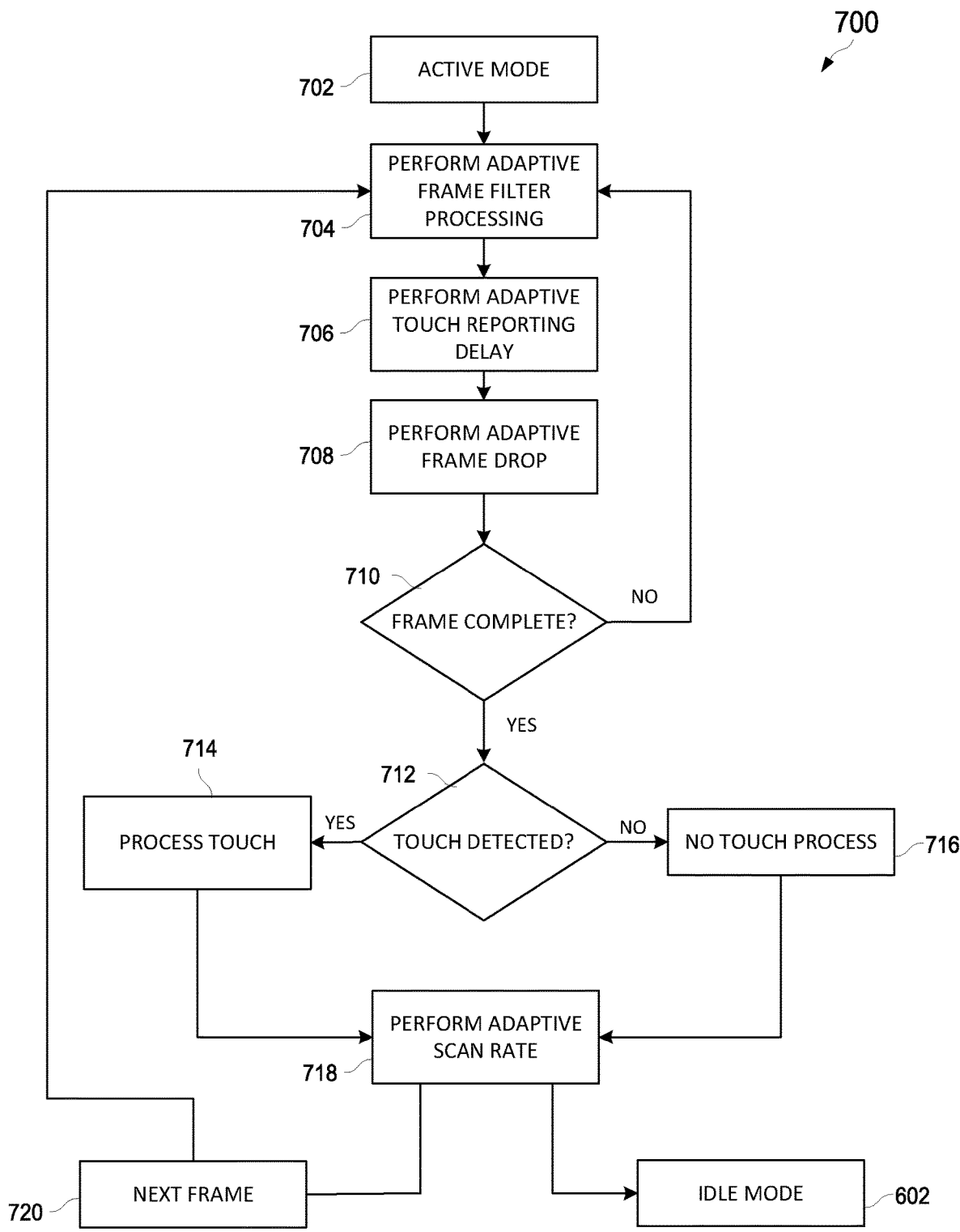
FIG. 7 is a flow chart of an embodiment method for operating a touchscreen in active mode and determining when to transition to idle mode.

FIG. 7 illustrates a flow chart of an embodiment method 700 for operating touchscreen 104 in active mode and determining when to transition to idle mode. At step 702, device 100 is initially operating in active mode. In embodiments, the current scan frame is the scan frame immediately after transitioning from the idle mode to the active mode based on the results from method 600.

In environments with high ambient noise, such as electrical noise from other electronic devices or RF (radio frequency) interference, touchscreen 104 can falsely detect touches or miss genuine touch inputs. In embodiments, adaptive frame filtering, adaptive touch reporting delay, and adaptive frame drop, as disclosed herein, mitigates these issues by fitting a regression model to the raw data, determining thresholds using machine learning, and using the coefficients against the thresholds to filter out noise and ignore touch processing for one or more scan frames. This allows the touchscreen 104 to adapt to varying noise levels in real time, discerning actual touches from noise, and ensuring consistent and accurate touch response.

In embodiments, the coefficient of the cubic term of the third order polynomial (i.e., coefficient $\beta_3$) and the coefficient of the linear term of the third order polynomial (i.e., coefficient $\beta_1$) determined provides noise level information for each row or column of the current scan frame. These coefficients are used in steps 704, 706, and 708.

At step 704, an adaptive frame filter processing in accordance with method 400, as described herein with respect to FIG. 4, is used to determine what type of filtering to be used on the raw data of the current frame. Adaptive frame filter processing is implemented on each row (or column) of the current frame while device 100 is in active mode. For each row or column of the current scan frame, the raw data is fitted into a regression model. The coefficients of the regression model are then used against threshold values to determine the type of filtering. The filtering that is determined is then applied to the raw data.

Advantageously, by using adaptive frame filter processing to determine the type of filtering to applied to the raw data, device 100 operates with greater accuracy, which minimizes false touch detections in active mode based on noise. Based on the adaptive frame filter processing, the type of filtering that is determined is applied to the raw data and a modified set of data is generated.

In embodiments, the adaptive frame filter processing is implemented on the raw data input collected using only the mutual capacitive sensing during the active mode. In embodiments, the self-sensing mode is disabled during active mode unless certain criteria, as disclosed herein, are met. By remaining in only mutual capacitive sensing mode and only analyzing one set of raw data, device 100 reduces computation and power requirement resources while improving data processing response time. In embodiments, the thresholds used to determine which type of filtering to apply to the raw data using adaptive frame filter processing are determined based on machine learning.

In embodiments, for each row or column of the current scan frame, the sum of the weighted absolute value of coefficient $\beta_3$ and the weighted absolute value of coefficient $\beta_1$ is computed ($w_0 \times abs(\beta_3) + w_1 \times abs(\beta_1)$), where $w_0$ and $w_1$ are the weights for, respectively the coefficient $\beta_3$ and coefficient $\beta_1$. In embodiments, the weights $w_0$ and $w_1$ are determined using machine learning. In embodiments, the weights $w_0$ and $w_1$ are predetermined values. In embodiments, the weights $w_0$ and $w_1$ are stored in memory. In embodiments, the weights $w_0$ and $w_i$ are configurable values.

In one embodiment, for each row or column of the current scan frame, the sum of the weighted absolute value of coefficient $\beta_3$ and the weighted absolute value of coefficient $\beta_1$ ($w_0 \times abs(\beta_3) + w_1 \times abs(\beta_1)$) is compared to a threshold, which is determined using machine learning. In embodiments, the threshold is determined offline. If the computed sum of the weighted absolute value of coefficient $\beta_3$ and the weighted absolute value of coefficient $\beta_1$ ($w_0 \times abs(\beta_3) + w_1 \times abs(\beta_1)$) is greater than the threshold for any row or column of the current scan frame, device 100 enables self-sensing mode for touchscreen 104, and the adaptive frame filter processing is implemented on the raw data input collected using self-capacitive sensing during the active mode. Otherwise, the device 100 remains in only mutual scan sensing mode. This determination can mathematically be represented, for each row or column, as: $w_0 \times abs(\beta_3) + w_1 \times abs(\beta_1)$ >threshold_1→Enable Self Sensing.

Once self sensing is enabled, if the computed sum of the weighted absolute value of coefficient $\beta_3$ and the weighted absolute value of coefficient $\beta_1$ ($w_0 \times abs(\beta_3) + w_1 \times abs(\beta_1)$) falls below the threshold for subsequent scan frames, device 100 disables self-sensing mode for touchscreen 104. This determination can mathematically be represented, for each row or column of the next frame, as: $w_0 \times abs(\beta_3) + w_1 \times abs(\beta_1)$<threshold_2→Disable Self Sensing, and threshold_2<threshold_1.

In embodiments, at step 706, an adaptive touch reporting delay processing is implemented in active mode to determine whether to change the result of the touch detection analysis for a specific number of frames. In adaptive touch reporting delay processing, a regression analysis is performed on the raw data set, similar to the adaptative frame filter processing. The coefficients from the regression model on the raw data are used to compare with threshold values to determine whether to change result of the touch detection analysis for a specific number of frames. In embodiments, the thresholds used for the adaptive touch reporting delay processing are based on machine learning. Adaptive touch reporting delay processing is described in further detail with respect to FIG. 8.

In embodiments, at step 708, an adaptive frame drop processing is implemented in active mode to determine whether to skip the touch detection analysis for the current frame. In adaptive frame drop processing, a regression analysis is performed on the raw data set, similar to the adaptative frame filter processing and adaptive touch reporting delay processing. The coefficients from the regression model on the raw data are used to compare with threshold values to determine whether to skip the touch detection analysis for the current frame. In embodiments, the thresholds used for the adaptive frame drop processing are based on machine learning. Adaptive frame drop processing is described in further detail with respect to FIG. 9.

Steps 706 and 708 are collectively referred to as adaptive noise immunity in the disclosure herein. Advantageously, the adaptive frame filter processing at step 704, adaptive touch reporting delay processing at step 706, and adaptive frame drop processing at step 708, reject false touch detections in determining a touch event in active mode. This improves noise immunity in device 100 when operating in active mode. In embodiments, steps 706 and 708 are completed in parallel. In embodiments, steps 706 and 708 are completed one after another, in any order. Steps 704, 706, and 708, advantageously, use machine learning to determine threshold values to reject false touch detection in active mode.

At step 710, a check is made to determine whether all rows or columns of the current scan frame have been analyzed based on steps 704, 706, and 708. If all rows or columns of the current scan frame have not been analyzed, steps 704 through 708 are repeated until the adaptive frame filter processing, adaptive touch reporting delay processing, and the adaptive frame drop processing are completed on all rows and columns of the current scan frame.

Once the entirety of the rows and columns of the current scan frame have been analyzed, a touch or no touch event determination is made at step 712.

In response to (i) the analysis of the modified set of data based on the filtering determined using the adaptive frame filter processing at step 704 indicating a touch event (touching or noise on the touchscreen for all rows and columns), (ii) the adaptive touch reporting delay processing at step 706 indicating to change the result of the touch detection analysis for a specific number of frames, or (iii) the adaptive frame drop processing at step 708 indicating to skip the touch detection analysis for the current frame, then a no touch event detection is determined.

In response to the (i) the analysis of the modified set of data based on the filtering determined using the adaptive frame filter processing at step 704 indicating a touch event (touching or noise on the touchscreen for all rows and columns), (ii) the adaptive touch reporting delay processing at step 706 indicating not to change the result of the touch detection analysis for a specific number of frames, and (iii) the adaptive frame drop processing at step 708 indicating not to skip the touch detection analysis for the current frame, then a touch event detection is determined.

In response to the adaptive frame drop processing at step 708 indicating to skip the touch detection analysis for the current frame, a no touch event detection is determined.

In response to the analysis of the modified set of data based on the filtering determined using the adaptive frame filter processing at step 704 indicating a no touch event the results of the adaptive touch reporting delay processing at step 706 and the adaptive frame drop processing at step 708 are ignored.

At step 714, in response to a touch event detection, controller 102 or processor 110 process and analyze the raw data or the modified set of data to determine, for example, the type of gesture and interaction by the user on the touchscreen 104.

In response to (i) the analysis of the modified set of data based on the filtering determined using the adaptive frame filter processing indicating a no touch event (no touching or noise on the touchscreen for all rows and columns), (ii) the adaptive touch reporting delay processing indicating to skip the touch detection analysis for a specific number of frames, or (iii) the adaptive frame drop processing indicating to skip the touch detection analysis for the current frame, a no touch event detection is determined. In embodiments, at step 712, in response to determining a no touch event at step 704, the results from steps 706 and 708 are ignored.

At step 716, in response to a no touch event detection, controller 102 or processor 110 analyzes the raw data and the modified set of data to determine the type of gesture and interaction by the user on the touchscreen 104.

At step 718, an adaptive scan rate processing is implemented in active mode where the scan rate is updated based on the touch event or no touch event detection.

In response to not detecting a touch event for a threshold period or not detecting a touch event for a threshold number of continuous frames, device 100 transitions to idle mode (i.e., step 602 of method 600). However, if a touch event occurs or a no touch event occurs for less than the threshold period or before the threshold number of frames, device 100 remains in active mode and method 700 is repeated for the next frame.

In adaptive scan rate, the threshold period, scan rate, or both are reduced based on a touch detection during active mode before transitioning to idle mode. If device 100 transitions from idle to active mode and no touch is detected in active mode for a first threshold period, the device transitions to idle mode. The first threshold period is reduced in comparison to the threshold period set in the conventional method 500 (i.e., step 516). In embodiments, the first threshold period for method 700 is set to a tenth of the threshold period in the conventional method. Thus, if no touch event is detected for the first threshold period, the device 100 transitions much quicker to idle mode to reduce power consumption by device 100.

If device 100 transitions from idle to active mode and a touch is detected in active mode, a second threshold period is set where if the device 100 does not detect a touch event during that second threshold period, the device 100 transitions to idle mode. During the second threshold period, the scan rate is set to the same scan rate as during scan mode for a first portion but the scan rate is set to a lower scan rate for a second portion. Thus, if no touch even is detected for the second threshold period, the device 100 transitions to idle mode but as the scan rate is reduced during the second portion, the power consumption by device 100 is reduced because of the reduction of power consumption for the lower scan rate. It is noted that if the device 100 detects a touch event during the second portion, the scan rate is returned to the original, higher scan rate.

In a conventional system, when the device transitions from idle to active mode, the scan rate does not change before the device transitions back from active to idle mode. For example, assuming that the device is operating with a scan rate of 240 Hz for a duration of 0.5 seconds (i.e., the threshold period being equal to 0.5 seconds without detecting a touch event at step 516), the number of frames is 120 (i.e., 240×0.5). If the power consumption for each scan rate is 0.004 mW, the device's power consumption is equal to 0.48 mW (i.e., 120×0.004). Thus, the device consumes 0.48 mW regardless of whether in active mode a touch report occurs or not before the threshold period passes without a touch report.

In contrast, device 100, operating in accordance with the adaptive scan rate of method 700, has a variable scan rate when operating in active mode based on the touch report from steps 704, 706, and 708. For example, assuming that the device is operating with a scan rate of 240 Hz in active mode, device 100 either (i) transitions from idle mode to active mode based and directly back to idle mode if no touch is detected for the duration of active mode or (ii) transitions from idle mode to active mode and a touch is detected in active mode and then transitions from active to idle mode after no touch event duration.

In the first scenario (i), the scan rate remains the same as in the conventional device, but the duration that the device remains in active mode is reduced to 0.05 seconds before it transitions to idle mode, corresponding to 12 frames (i.e., 240×0.05). If the power consumption for each scan rate is 0.004 mW, device 100 has a power consumption equal to 0.048 mW (i.e., 12×0.004), corresponding to a reduction in power consumption of 90% (i.e., 0.48 mW versus 0.048 mW).

In the second scenario (ii), the duration (0.5 seconds) that the device remains in active mode remains the same as in the conventional device but the scan rate is varied from 240 Hz for a first period (e.g., 0.25 seconds), corresponding to a frame count of 60 (e.g., 240×0.25) to 180 Hz for a second period (e.g., 0.25 seconds), corresponding to a frame count of 45 (e.g., 180×0.25. Assuming that the power consumption for each scan rate at 240 Hz is 0.004 mW and the power consumption for each scan rate at 180 Hz is 0.002 mW, device 100 has a power consumption equal to 0.24 mW (i.e., 60×0.004) for the first duration and 0.09 mW (i.e., 45×0.002) for a total of 0.33 mW, corresponding to a reduction in power consumption of greater than 30% (i.e., 0.42 mW versus 0.48 mW).

Figure 8:
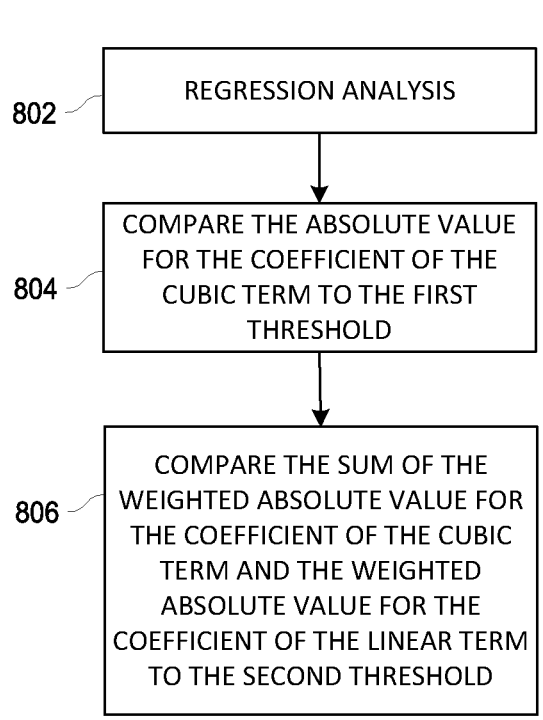
FIG. 8 is a flow chart of an embodiment method for adaptive touch reporting delay processing.

FIG. 8 illustrates a flow chart of an embodiment method 800 for adaptive touch reporting delay processing. In embodiments, method 800 is implemented as step 706 of method 700. Adaptive touch reporting delay processing is implemented in active mode to change the result of the touch detection analysis for a specific number of frames. Specifically, a touch report (i.e., indicating a touch event) is only reported after consistently detecting several continuous frames with valid mutual strength. If any of these frames are invalid, the touch report is discarded (i.e., indicating a no touch event). In embodiments, the number of frames is determined using machine learning.

At step 802, the raw data for each row or column of the current scan frame, similar to the adaptive frame filter processing step, is fitted into a regression model. In embodiments, for each row or column of the current scan frame, the coefficient of the cubic term (i.e., coefficient $\beta_3$) and the linear term (i.e., coefficient $\beta_1$) are determined. Based on the coefficient values, two methods are proposed herein for triggering an adaptive touch reporting delay, which can be implemented individually or in combination.

At step 804, in the first method, for each row or column of the current scan frame, the absolute value for the coefficient of the cubic term ($abs(\beta_3)$) is computed. In one embodiment, for each row or column of the current scan frame, the absolute value for the coefficient of the cubic term ($abs(\beta_3)$) is compared to a first threshold, which is determined using machine learning. In embodiments, the first threshold is determined offline. If the computed absolute value for the coefficient of the cubic term ($abs(\beta_3)$) is greater than the first threshold for any row or column of the current scan frame, the adaptive touch reporting delay is triggered indicating to the device 100 to change the result of the touch detection analysis for the specific number of frames. This determination can mathematically be represented, for each row or column, as: ($abs(\beta_3)$)>first threshold→Trigger Adaptive Touch Reporting Delay.

In a second embodiment, the maximum value of the absolute value for the coefficient of the cubic term ($max(abs(\beta_3))$) for all rows and columns for the current scan frame is first computed and then compared to the first threshold. If the computed maximum value of the absolute value for the coefficient of the cubic term ($max(abs(\beta_3))$) for the current scan frame is greater than the first threshold, the adaptive touch reporting delay is triggered indicating to the device 100 to change the result of the touch detection analysis for the specific number of frames. This determination can mathematically be represented as: $max(abs(\beta_3))$>first threshold→Trigger Adaptive Touch Reporting Delay.

At step 806, in the second method, for each row or column of the current scan frame, the sum of the weighted absolute value of coefficient $\beta_3$ and the weighted absolute value of coefficient $\beta_1$ is computed ($w_0 \times abs(3) + w_1 \times abs(\beta_1)$), where $w_0$ and $w_1$ are the weights for, respectively the coefficient $\beta_3$ and coefficient $\beta_1$. In embodiments, the weights $w_0$ and $w_1$ are determined using machine learning. In embodiments, the weights $w_0$ and $w_1$ are predetermined values. In embodiments, the weights $w_0$ and $w_1$ are stored in memory. In embodiments, the weights $w_0$ and $w_1$ are configurable values.

In one embodiment, for each row or column of the current scan frame, the sum of the weighted absolute value of coefficient $\beta_3$ and the weighted absolute value of coefficient $\beta_1$ ($w_0 \times abs(\beta_3) + w_1 \times abs(\beta_1)$) is compared to a second threshold, which is determined using machine learning. In embodiments, the second threshold is determined offline. If the computed sum of the weighted absolute value of coefficient $\beta_3$ and the weighted absolute value of coefficient $\beta_1$($w_0 \times abs(\beta_3) + w_1 \times abs(\beta_1)$) is greater than the second threshold for any row or column of the current scan frame, the adaptive touch reporting delay is triggered indicating to the device 100 to change the result of the touch detection analysis for the specific number of frames. This determination can mathematically be represented, for each row or column, as: $w_0 \times abs(\beta_3) + w_1 \times abs(\beta_1) >$ second threshold→Trigger Adaptive Touch Reporting Delay.

In a second embodiment, the maximum value of the sum of the weighted absolute value of coefficient $\beta_3$ and the weighted absolute value of coefficient $\beta_1$ ($\max(w_0 \times abs(\beta_3) + w_1 \times abs(\beta_1))$) for all rows and columns for the current scan frame is first computed and then compared to the second threshold. If the computed maximum value of the sum of the weighted absolute value of coefficient $\beta_3$ and the weighted absolute value of coefficient $\beta_1$, ($\max(w_0 \times abs(\beta_3) + w_1 \times abs(\beta_1))$) for the current scan frame is greater than the second threshold, the adaptive touch reporting delay is triggered indicating to the device 100 to change the result of the touch detection analysis for the specific number of frames. This determination can mathematically be represented, for each row or column, as: $\max(w_0 \times abs(\beta_3) + w_1 \times abs(\beta_1)) >$ second threshold→Trigger Adaptive Touch Reporting Delay.

In embodiments, only mutual sensing data is used for adaptive touch reporting delay instead of mutual and self-sensing data. In embodiments, in response to the sum of the weighted absolute value of coefficient $\beta_3$ and the weighted absolute value of coefficient $\beta_1$, is computed ($w_0 \times abs(3) + w_1 \times abs(\beta_1)$) for the current row or column exceeding the threshold to enable self-sensing. Using only mutual sensing reduces power consumption by device 100 for touch detection in active mode. Adaptive touch reporting delay, advantageously, improves noise immunity to reject false touch detection from noisy data. In embodiments, self-sensing is enabled in response to exceeding the threshold, and in combination with adaptive touch reporting delay is used to reject false touch detection in large noise situations.

Thus, adaptive touch reporting delay reports a touch event after continuously detecting multiple frames with validated mutual sensing strengths. In contrast, if any frame within the multiple frames includes an invalid mutual sensing strength, a no touch event is detected, preventing inaccurate or unintended interactions from being registered by the system. This method ensures a higher level of accuracy and reliability in touch reporting by only accepting continuous sequences of valid sensory data and rejecting any sequences with interruptions due to invalid data.

Assuming in an example case we have four consecutive frames: the first two frames erroneously suggest a touch event due to noise and the latter two frames correctly show no touch. In conventional systems, the device controller would falsely detect a touch event for the first two frames, leading to touch analysis by the controller for each frame, and energy consumption. In contrast, with the proposed adaptive touch reporting delay process, as proposed in method 800, where the number of frames to be skipped in response to triggering the adaptive touch reporting delay is two, the first two frames change to no touch event and faster switching to idle mode, and power consumption is reduced in comparison.

Assuming in a second example case we have four consecutive frames and all four frames correspond to a touch event by the user. In conventional systems, the device controller would detect a touch event for each of the four frames. In contrast, with the proposed adaptive touch reporting delay process, as proposed in method 800, where the number of frames to be skipped in response to triggering the adaptive touch reporting delay is two, the first two frames are changed to a no touch event, which improves the accuracy of touch in comparison to the noisy case. This is because the initial frame is the initial moment where the finger makes contact, which may not have the accuracy of a touch event due to the finger barely making contact at that initial frame.

Figure 9:
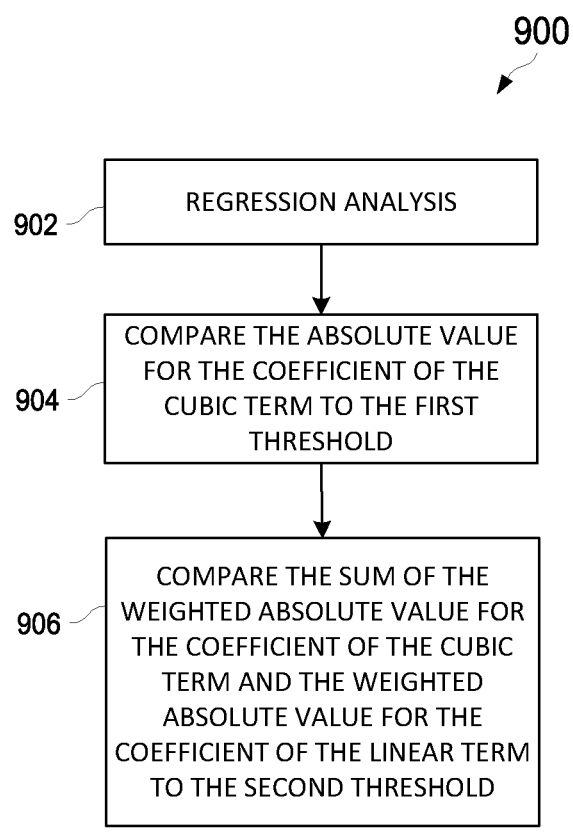
FIG. 9 is a flow chart of an embodiment method for adaptive frame drop processing.

FIG. 9 illustrates a flow chart of an embodiment method 900 for adaptive frame drop processing. In embodiments, method 900 is implemented as step 708 of method 700. Adaptive frame drop processing is implemented in active mode to determine whether to skip the touch detection analysis for the current scan frame.

At step 902, the raw data for each row or column of the current scan frame, similar to the adaptive frame filter processing and the adaptive touch reporting delay processing steps, is fitted into a regression model. In embodiments, for each row or column of the current scan frame, the coefficient of the cubic term (i.e., coefficient $\beta_3$) and the linear term (i.e., coefficient $\beta_1$) are determined. Based on the coefficient values, two methods are proposed herein for triggering an adaptive frame drop, which can be implemented individually or in combination.

At step 904, in the first method, for each row or column of the current scan frame, the absolute value for the coefficient of the cubic term ($abs(\beta_3)$) is computed. In one embodiment, for each row or column of the current scan frame, the absolute value for the coefficient of the cubic term ($abs(\beta_3)$) is compared to a first threshold (different from the first threshold of the adaptive touch reporting delay in method 800), which is determined using machine learning. In embodiments, the first threshold is determined offline. If the computed absolute value for the coefficient of the cubic term ($abs(\beta_3)$) is greater than the first threshold for any row or column of the current scan frame, the adaptive frame drop is triggered indicating to the device 100 to skip the touch detection analysis for the current frame. This determination can mathematically be represented, for each row or column, as: ($abs(\beta_3)$)>first threshold→Trigger Adaptive Frame Drop.

In a second embodiment, the maximum value of the absolute value for the coefficient of the cubic term ($\max(abs(\beta_3))$) for all rows and columns for the current scan frame is first computed and then compared to the first threshold. If the computed maximum value of the absolute value for the coefficient of the cubic term ($\max(abs(\beta_3))$) for the current scan frame is greater than the first threshold, the adaptive frame drop is triggered indicating to the device 100 to skip the touch detection analysis for the current frame. This determination can mathematically be represented as: max($abs(\beta_3)$)>first threshold→Trigger Adaptive Frame Drop.

At step 906, in the second method, for each row or column of the current scan frame, the sum of the weighted absolute value of coefficient $\beta_3$ and the weighted absolute value of coefficient $\beta_1$ is computed ($w_0 \times abs(\beta_3) + w_1 \times abs(\beta_1)$), where $w_0$ and $w_1$ are the weights for, respectively the coefficient $\beta_3$ and coefficient $\beta_1$. In embodiments, the weights $w_0$ and $w_1$ are determined using machine learning. In embodiments, the weights $w_0$ and $w_1$ are predetermined values. In embodiments, the weights $w_0$ and $w_1$ are stored in memory. In embodiments, the weights $w_0$ and $w_1$ are configurable values. In embodiments, the weights $w_0$ and $w_1$ are the same weights used in the adaptive touch reporting delay of method 800.

In one embodiment, for each row or column of the current scan frame, the sum of the weighted absolute value of coefficient $\beta_3$ and the weighted absolute value of coefficient $\beta_1$ ($w_0 \times abs(\beta_3) + w_1 \times abs(\beta_1)$) is compared to a second threshold (different from the first threshold of the adaptive touch reporting delay in method 800), which is determined using machine learning. In embodiments, the second threshold is determined offline. If the computed sum of the weighted absolute value of coefficient $\beta_3$ and the weighted absolute value of coefficient $\beta_1$ ($w_0 \times abs(\beta_3) + w_1 \times abs(\beta_1)$) is greater than the second threshold for any row or column of the current scan frame, the adaptive frame drop is triggered indicating to the device 100 to skip the touch detection analysis for the current frame. This determination can mathematically be represented, for each row or column, as: $w_0 \times abs(\beta_3) + w_1 \times abs(\beta_1)$>second threshold→Trigger Adaptive Frame Drop.

In a second embodiment, the maximum value of the sum of the weighted absolute value of coefficient $\beta_3$ and the weighted absolute value of coefficient $\beta_1$ ($\max(w_0 \times abs(\beta_3) + w_1 \times abs(\beta_1))$) for all rows and columns for the current scan frame is first computed and then compared to the second threshold. If the computed maximum value of the sum of the weighted absolute value of coefficient $\beta_3$ and the weighted absolute value of coefficient $\beta_1$ ($\max(w_0 \times abs(\beta_3) + w_1 \times abs(\beta_1))$) for the current scan frame is greater than the second threshold, the adaptive frame drop is triggered indicating to the device 100 to skip the touch detection analysis for the current frame. This determination can mathematically be represented, for each row or column, as: $\max(w_0 \times abs(\beta_3) + w_1 \times abs(\beta_1))$>second threshold→Trigger Adaptive Frame Drop.

In embodiments, only mutual sensing data is used for adaptive frame drop instead of mutual and self-sensing data. Using only mutual sensing reduces power consumption by device 100 for touch detection in active mode. Adaptive frame drop, advantageously, improves noise immunity to reject false touch detection from noisy data.

Thus, adaptive frame drop reports a touch event after detecting multiple a frame with validated mutual sensing strength. In contrast, if the frame has an invalid mutual sensing strength, a no touch event is detected, preventing inaccurate or unintended interactions from being registered by the system. This method ensures a higher level of accuracy and reliability in touch reporting by only accepting valid sensory data and rejecting any sequences with interruptions due to invalid data.

In embodiments, the first threshold for adaptive frame drop in method 900 is greater than the first threshold for adaptive touch reporting delay in method 800. In such embodiments, adaptive frame drop is only triggered in the current frame or the frame after adaptive touch reporting delay has been triggered.

In embodiments, the second threshold for the adaptive frame drop in method 900 is greater than the second threshold for adaptive touch reporting delay in method 800. In such embodiments, adaptive frame drop is triggered in the current frame or the frame after adaptive touch reporting delay is triggered.

In embodiments, the threshold to enable self-sensing in method 700 is less than the second threshold for the adaptive frame drop in method 900 but greater than the second threshold for the adaptive touch reporting delay in method 800. In such embodiments, as the threshold to enable self-sensing is less than the second threshold for adaptive frame drop, the adaptive frame drop in method 900 uses the raw data from the mutual and self-sensing for touch report.

Assuming in an example case we have four consecutive frames: the second frame erroneously suggests a touch event due to noise and the first and the latter two frames correctly show no touch. In conventional systems, the device controller would falsely detect a touch event for the second frame, leading to touch analysis by the controller for the frame, and energy consumption. In contrast, with the proposed adaptive frame drop process, as proposed in method 900 the second frames is bypassed, no touch analysis is performed, and power consumption is reduced in comparison.

It is noted that all steps outlined in the flow charts of methods are not necessarily required and can be optional. Further, changes to the arrangement of the steps, removal of one or more steps and path connections, and addition of steps and path connections are similarly contemplated.

A first aspect relates to a method for operating a touchscreen in active mode. The method includes performing a regression analysis on each subset of a dataset for a current scan frame of the touchscreen, each subset of the dataset corresponding to inputs from a respective row of a matrix of sensors at a time instant k, the regression analysis generating a set of coefficients; applying a filter transform on each subset of the dataset based on a comparison between the set of coefficients and first threshold values to generate an output matrix; determining whether to perform a touch analysis by a user on the touchscreen based on the output matrix; determining a frame drop corresponding to determining whether to skip the current frame for the touch analysis based on a comparison of the set of coefficients and second threshold values; and determining a touch delay corresponding to determining whether to change a result of a first number of subsequent frames for the touch analysis based on a comparison of the set of coefficients and third threshold values.

In a first implementation form of the method according to the first aspect as such, the first threshold values, the second threshold values, and the third threshold values are determined offline using machine learning.

In a second implementation form of the method according to the first aspect as such or any preceding implementation form of the first aspect as such, the determining the first threshold values, the second threshold values, and the third threshold values includes determining a range of values for the set of coefficients in accordance with a variety of models associated with interactions with the matrix of sensors.

In a third implementation form of the method according to the first aspect as such or any preceding implementation form of the first aspect as such, the matrix of sensors are sensors of a capacitive touch screen, the method further includes determining touch detection or touch tracking based on the updated output matrix in response to not determining to skip the current frame or to change a result of the first number of subsequent frames for the touch analysis.

In a fourth implementation form of the method according to the first aspect as such or any preceding implementation form of the first aspect as such, the method includes transitioning the touchscreen from active mode to idle mode after a first duration immediately after transitioning from idle mode to active mode. The transitioning is in response to an absence of a touch event, an absence of a frame drop for consecutive frames during the first duration, an absence of a touch delay for consecutive frames during the first duration, or a combination thereof.

In a fifth implementation form of the method according to the first aspect as such or any preceding implementation form of the first aspect as such, the method includes transitioning the touchscreen from active mode to idle mode after a second duration greater than the first duration, the transitioning being in response to first detecting a touch event and then failing to detect a touch event. The transition has a duration equal to the second duration and starting immediately after a frame where a last touch event is detected. The transition being further in response to an absence of a touch event, an absence of a frame drop for consecutive frames during the first duration, an absence of a touch delay for consecutive frames, or a combination thereof, during the second duration.

In a sixth implementation form of the method according to the first aspect as such or any preceding implementation form of the first aspect as such, further includes setting the touchscreen for a first portion of the second duration to a first scan rate and setting the touchscreen for a second portion after the first portion of the second duration to a second scan rate less than the first scan rate.

A second aspect relates to a device. The device includes a grid sensor comprising a matrix of sensors arranged in a grid; a non-transitory memory storage comprising instructions; and a processor in communication with the non-transitory memory storage and the grid sensor, wherein the instructions, when executed by the processor, cause the processor to: perform a regression analysis on each subset of a dataset for a current scan frame of the touchscreen, each subset of the dataset corresponding to inputs from a respective row of a matrix of sensors at a time instant k, the regression analysis generating a set of coefficients, apply a filter transform on each subset of the dataset based on a comparison between the set of coefficients and first threshold values to generate an output matrix, determine whether to perform a touch analysis by a user on the touchscreen based on the output matrix, determine a frame drop corresponding to determining whether to skip the current frame for the touch analysis based on a comparison of the set of coefficients and second threshold values, and determine a touch delay corresponding to determining whether to change a result of a first number of subsequent frames for the touch analysis based on a comparison of the set of coefficients and third threshold values.

In a first implementation form of the device according to the second aspect as such, the first threshold values, the second threshold values, and the third threshold values are determined offline using machine learning.

In a second implementation form of the device according to the second aspect as such or any preceding implementation form of the second aspect as such, the determining the first threshold values, the second threshold values, and the third threshold values includes determining a range of values for the set of coefficients in accordance with a variety of models associated with interactions with the matrix of sensors.

In a third implementation form of the device according to the second aspect as such or any preceding implementation form of the second aspect as such, the matrix of sensors are sensors of a capacitive touch screen. The instructions, when executed by the processor, cause the processor to determine touch detection or touch tracking based on the output matrix in response to not determining to skip the current frame or to change a result of the first number of subsequent frames for the touch analysis.

In a fourth implementation form of the device according to the second aspect as such or any preceding implementation form of the second aspect as such, the instructions, when executed by the processor, cause the processor to transition the touchscreen from active mode to idle mode after a first duration immediately after transitioning from idle mode to active mode. The transitioning being in response to an absence of a touch event, an absence of a frame drop for consecutive frames during the first duration, an absence of a touch delay for consecutive frames during the first duration, or a combination thereof.

In a fifth implementation form of the device according to the second aspect as such or any preceding implementation form of the second aspect as such, the instructions, when executed by the processor, cause the processor to transition the touchscreen from active mode to idle mode after a second duration greater than the first duration. The transitioning being in response to first detecting a touch event and then failing to detect a touch event. The transition having a duration equal to the second duration and starting immediately after a frame where a last touch event is detected. The transition being further in response to an absence of a touch event, an absence of a frame drop for consecutive frames during the first duration, an absence of a touch delay for consecutive frames, or a combination thereof, during the second duration.

In a fifth implementation form of the device according to the second aspect as such or any preceding implementation form of the second aspect as such, the instructions, when executed by the processor, cause the processor to set the touchscreen for a first portion of the second duration to a first scan rate and setting the touchscreen for a second portion after the first portion of the second duration to a second scan rate less than the first scan rate.

A third aspect relates to a non-transitory computer readable media storing computer instructions for operating a touchscreen in active mode, that when executed by a processor, cause the processor to: perform a regression analysis on each subset of a dataset for a current scan frame of the touchscreen, each subset of the dataset corresponding to inputs from a respective row of a matrix of sensors at a time instant k, the regression analysis generating a set of coefficients; apply a filter transform on each subset of the dataset based on a comparison between the set of coefficients and first threshold values to generate an output matrix; determine whether to perform a touch analysis by a user on the touchscreen based on the output matrix; determine a frame drop corresponding to determining whether to skip the current frame for the touch analysis based on a comparison of the set of coefficients and second threshold values; and determine a touch delay corresponding to determining whether to change a result of a first number of subsequent frames for the touch analysis based on a comparison of the set of coefficients and third threshold values.

In a first implementation form of the non-transitory computer readable media according to the third aspect as such, the first threshold values, the second threshold values, and the third threshold values are determined offline using machine learning.

In a second implementation form of the non-transitory computer readable media according to the third aspect as such or any preceding implementation form of the third aspect as such, the determining the first threshold values, the second threshold values, and the third threshold values comprises determining a range of values for the set of coefficients in accordance with a variety of models associated with interactions with the matrix of sensors.

In a third implementation form of the non-transitory computer readable media according to the third aspect as such or any preceding implementation form of the third aspect as such, the matrix of sensors are sensors of a capacitive touch screen. The instructions, when executed by the processor, cause the processor to determine touch detection or touch tracking based on the output matrix in response to not determining to skip the current frame or to change a result of the first number of subsequent frames for the touch analysis.

In a fourth implementation form of the non-transitory computer readable media according to the third aspect as such or any preceding implementation form of the third aspect as such, the instructions, when executed by the processor, cause the processor to transition the touchscreen from active mode to idle mode after a first duration immediately after transitioning from idle mode to active mode. The transitioning being in response to an absence of a touch event, an absence of a frame drop for consecutive frames during the first duration, an absence of a touch delay for consecutive frames during the first duration, or a combination thereof.

In a fifth implementation form of the non-transitory computer readable media according to the third aspect as such or any preceding implementation form of the third aspect as such, the instructions, when executed by the processor, cause the processor to transition the touchscreen from active mode to idle mode after a second duration greater than the first duration. The transitioning being in response to first detecting a touch event and then failing to detect a touch event. The transition having a duration equal to the second duration and starting immediately after a frame where a last touch event is detected. The transition being further in response to an absence of a touch event, an absence of a frame drop for consecutive frames during the first duration, an absence of a touch delay for consecutive frames, or a combination thereof, during the second duration.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for operating a touchscreen in active mode, the method comprising:
    performing a regression analysis on each subset of a dataset for a current scan frame of the touchscreen, each subset of the dataset corresponding to inputs from a respective row of a matrix of sensors at a time instant k, the regression analysis generating a set of coefficients;
    applying a filter transform on each subset of the dataset based on a comparison between the set of coefficients and first threshold values to generate an output matrix;
    determining whether to perform a touch analysis by a user on the touchscreen based on the output matrix;
    determining a frame drop corresponding to determining whether to skip the current frame for the touch analysis based on a comparison of the set of coefficients and second threshold values; and
    determining a touch delay corresponding to determining whether to change a result of a first number of subsequent frames for the touch analysis based on a comparison of the set of coefficients and third threshold values.

2. The method of claim 1, wherein the first threshold values, the second threshold values, and the third threshold values are determined offline using machine learning.

3. The method of claim 2, wherein the determining the first threshold values, the second threshold values, and the third threshold values comprises determining a range of values for the set of coefficients in accordance with a variety of models associated with interactions with the matrix of sensors.

4. The method of claim 1, wherein the matrix of sensors is sensors of a capacitive touch screen, the method further comprising determining touch detection or touch tracking based on the updated output matrix in response to not determining to skip the current frame or to change a result of the first number of subsequent frames for the touch analysis.

5. The method of claim 1, further comprising transitioning the touchscreen from active mode to idle mode after a first duration immediately after transitioning from idle mode to active mode, the transitioning being in response to an absence of a touch event, an absence of a frame drop for consecutive frames during the first duration, an absence of a touch delay for consecutive frames during the first duration, or a combination thereof.

6. The method of claim 5, further comprising transitioning the touchscreen from active mode to idle mode after a second duration greater than the first duration, the transitioning being in response to first detecting a touch event and then failing to detect a touch event, the transition having a duration equal to the second duration and starting immediately after a frame where a last touch event is detected, wherein the transition is further in response to an absence of a touch event, an absence of a frame drop for consecutive frames during the first duration, an absence of a touch delay for consecutive frames, or a combination thereof, during the second duration.

7. The method of claim 6, further comprising setting the touchscreen for a first portion of the second duration to a first scan rate and setting the touchscreen for a second portion after the first portion of the second duration to a second scan rate less than the first scan rate.

8. A device, comprising:
a grid sensor comprising a matrix of sensors arranged in a grid;
a non-transitory memory storage comprising instructions; and
a processor in communication with the non-transitory memory storage and the grid sensor, wherein the instructions, when executed by the processor, cause the processor to:
perform a regression analysis on each subset of a dataset for a current scan frame of the touchscreen, each subset of the dataset corresponding to inputs from a respective row of the matrix of sensors at a time instant k, the regression analysis generating a set of coefficients,
apply a filter transform on each subset of the dataset based on a comparison between the set of coefficients and first threshold values to generate an output matrix,
determine whether to perform a touch analysis by a user on the touchscreen based on the output matrix,
determine a frame drop corresponding to determining whether to skip the current frame for the touch analysis based on a comparison of the set of coefficients and second threshold values, and
determine a touch delay corresponding to determining whether to change a result of a first number of subsequent frames for the touch analysis based on a comparison of the set of coefficients and third threshold values.

9. The device of claim 8, wherein the first threshold values, the second threshold values, and the third threshold values are determined offline using machine learning.

10. The device of claim 9, wherein the determining the first threshold values, the second threshold values, and the third threshold values comprises determining a range of values for the set of coefficients in accordance with a variety of models associated with interactions with the matrix of sensors.

11. The device of claim 8, wherein the matrix of sensors is sensors of a capacitive touch screen, and wherein the instructions, when executed by the processor, cause the processor to determine touch detection or touch tracking based on the output matrix in response to not determining to skip the current frame or to change a result of the first number of subsequent frames for the touch analysis.

12. The device of claim 8, wherein the instructions, when executed by the processor, cause the processor to transition the touchscreen from active mode to idle mode after a first duration immediately after transitioning from idle mode to active mode, the transitioning being in response to an absence of a touch event, an absence of a frame drop for consecutive frames during the first duration, an absence of a touch delay for consecutive frames during the first duration, or a combination thereof.

13. The device of claim 12, wherein the instructions, when executed by the processor, cause the processor to transition the touchscreen from active mode to idle mode after a second duration greater than the first duration, the transitioning being in response to first detecting a touch event and then failing to detect a touch event, the transition having a duration equal to the second duration and starting immediately after a frame where a last touch event is detected, wherein the transition is further in response to an absence of a touch event, an absence of a frame drop for consecutive frames during the first duration, an absence of a touch delay for consecutive frames, or a combination thereof, during the second duration.

14. The device of claim 12, wherein the instructions, when executed by the processor, cause the processor to set the touchscreen for a first portion of the second duration to a first scan rate and set the touchscreen for a second portion after the first portion of the second duration to a second scan rate less than the first scan rate.

15. A non-transitory computer readable medium storing computer instructions for operating a touchscreen in active mode, that when executed by a processor, cause the processor to:
perform a regression analysis on each subset of a dataset for a current scan frame of the touchscreen, each subset of the dataset corresponding to inputs from a respective row of a matrix of sensors at a time instant k, the regression analysis generating a set of coefficients;
apply a filter transform on each subset of the dataset based on a comparison between the set of coefficients and first threshold values to generate an output matrix;
determine whether to perform a touch analysis by a user on the touchscreen based on the output matrix;
determine a frame drop corresponding to determining whether to skip the current frame for the touch analysis based on a comparison of the set of coefficients and second threshold values; and
determine a touch delay corresponding to determining whether to change a result of a first number of subsequent frames for the touch analysis based on a comparison of the set of coefficients and third threshold values.

16. The non-transitory computer readable medium of claim 15, wherein the first threshold values, the second threshold values, and the third threshold values are determined offline using machine learning.

17. The non-transitory computer readable medium of claim 16, wherein the determining the first threshold values, the second threshold values, and the third threshold values comprises determining a range of values for the set of coefficients in accordance with a variety of models associated with interactions with the matrix of sensors.

18. The non-transitory computer readable medium of claim 15, wherein the matrix of sensors is sensors of a capacitive touch screen, and wherein the instructions, when executed by the processor, cause the processor to determine touch detection or touch tracking based on the output matrix in response to not determining to skip the current frame or to change a result of the first number of subsequent frames for the touch analysis.

19. The non-transitory computer readable medium of claim 15, wherein the instructions, when executed by the processor, cause the processor to transition the touchscreen from active mode to idle mode after a first duration immediately after transitioning from idle mode to active mode, the transitioning being in response to an absence of a touch event, an absence of a frame drop for consecutive frames during the first duration, an absence of a touch delay for consecutive frames during the first duration, or a combination thereof.

20. The non-transitory computer readable medium of claim 19, wherein the instructions, when executed by the processor, cause the processor to transition the touchscreen from active mode to idle mode after a second duration greater than the first duration, the transitioning being in response to first detecting a touch event and then failing to detect a touch event, the transition having a duration equal to the second duration and starting immediately after a frame where a last touch event is detected, wherein the transition is further in response to an absence of a touch event, an absence of a frame drop for consecutive frames during the first duration, an absence of a touch delay for consecutive frames, or a combination thereof, during the second duration.

* * * * *